United States Patent
Sakakibara

(10) Patent No.: US 7,944,717 B2
(45) Date of Patent: May 17, 2011

(54) POWER CONVERTER APPARATUS AND POWER CONVERTER APPARATUS CONTROL METHOD

(75) Inventor: Kenichi Sakakibara, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 316 days.

(21) Appl. No.: 12/297,845

(22) PCT Filed: Apr. 17, 2007

(86) PCT No.: PCT/JP2007/058337
§ 371 (c)(1),
(2), (4) Date: Oct. 20, 2008

(87) PCT Pub. No.: WO2007/123118
PCT Pub. Date: Nov. 1, 2007

(65) Prior Publication Data
US 2009/0175059 A1    Jul. 9, 2009

(30) Foreign Application Priority Data

Apr. 20, 2006   (JP) ................................ 2006-116722
Nov. 29, 2006   (JP) ................................ 2006-321687
Nov. 29, 2006   (JP) ................................ 2006-321703

(51) Int. Cl.
H02M 5/45   (2006.01)
H02J 3/00   (2006.01)
(52) U.S. Cl. ......................................... 363/37; 363/34
(58) Field of Classification Search ................. 363/34, 363/37, 97, 98, 131, 132; 318/801–803, 318/807, 809
See application file for complete search history.

(56) References Cited

U.S. PATENT DOCUMENTS

| 4,188,663 A * | 2/1980 | Okawa et al. .................... 363/51 |
| 5,657,220 A | 8/1997 | Yan |
| 6,088,246 A | 7/2000 | Okuyama et al. |
| 7,068,526 B2 * | 6/2006 | Yamanaka et al. .............. 363/98 |
| 2010/0172161 A1 * | 7/2010 | Tallam et al. .................... 363/37 |

(Continued)

FOREIGN PATENT DOCUMENTS

JP           04-121065 A     4/1992

(Continued)

OTHER PUBLICATIONS

Wei et al.; "A Novel Matrix Converter Topology with Simple Communication"; Department of Electrical and Computer Engineering University of Wisconsin-Madison; WI. 2001.

(Continued)

Primary Examiner — Matthew V Nguyen
(74) Attorney, Agent, or Firm — Global IP Counselors

(57) ABSTRACT

A converter section converts a three-phase ac input voltage into a dc voltage, and an inverter section converts the dc voltage converted by the converter section into a prescribed three-phase ac output voltage. The converter section converts the three-phase ac input voltage into the dc voltage on the basis of trapezoidal waveform voltage instruction signals from a trapezoidal waveform voltage instruction signal generating part and a carrier signal from a carrier signal generating part. The inverter section converts the dc voltage converted by the converter section 1 into a prescribed three-phase ac output voltage on the basis of an inverter section instruction signal corrected by an instruction signal correcting part. The trapezoidal waveform voltage instruction signal generating part generates sloped regions of the trapezoidal waveform voltage instruction signals by using a prescribed table.

23 Claims, 20 Drawing Sheets

U.S. PATENT DOCUMENTS

2010/0246217 A1* 9/2010 Sakakibara .................... 363/37

FOREIGN PATENT DOCUMENTS

| JP | 05-056655 A | 3/1993 |
| JP | 06-84514 B2 | 10/1994 |
| JP | 08-228488 A | 9/1996 |
| JP | 11-018488 A | 1/1999 |
| JP | 2002-17088 A | 1/2002 |
| JP | 2002-64985 A | 2/2002 |
| JP | 2004-222338 A | 8/2004 |
| JP | 2004-266972 A | 9/2004 |

OTHER PUBLICATIONS

Takeshita et al.; "PWM Scheme for Current Source Three-Phase Inverters and Converters"; University of Nagoya Institute of Technology; Japan 1996.

Klumpner; "An Indirect Matrix Converter with a Cost Effective Protection and Control"; University of Nottingham; Nottingham, UK, 2005.

* cited by examiner

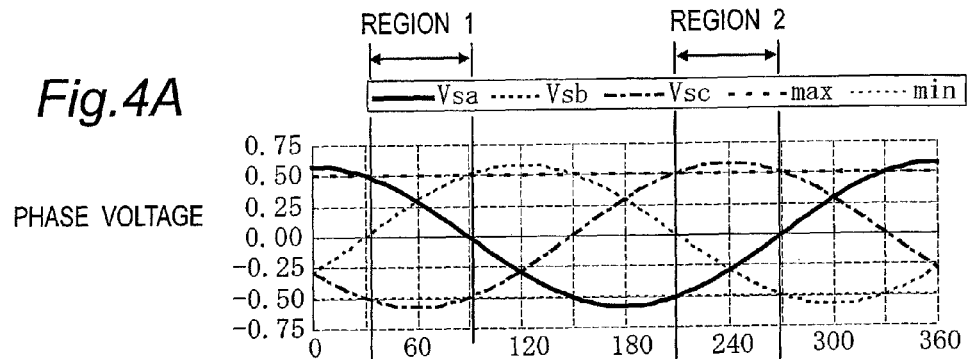
Fig.4A PHASE VOLTAGE
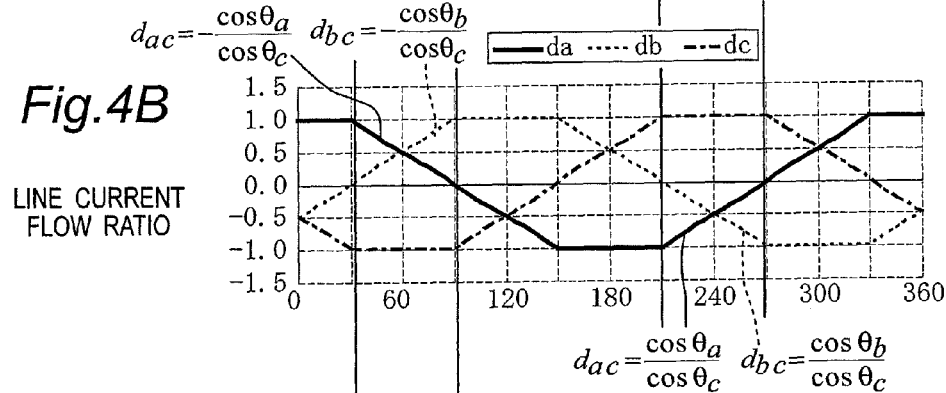
Fig.4B LINE CURRENT FLOW RATIO
$$d_{ac}=\frac{\cos\theta_a}{\cos\theta_c} \quad d_{bc}=\frac{\cos\theta_b}{\cos\theta_c}$$
$$\cos\theta_{in}=\max(|\cos\theta_a|,|\cos\theta_b|,|\cos\theta_c|)$$
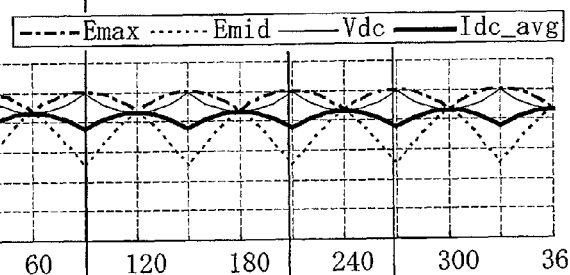
$$V_{dc}=3V_m/(2\cos\theta_{in})$$
$$i_{dc\_avg}=kI_o\cos\psi\cos\theta_{in}$$
Fig.4C DC LINK WAVEFORM AVERAGE VALUE
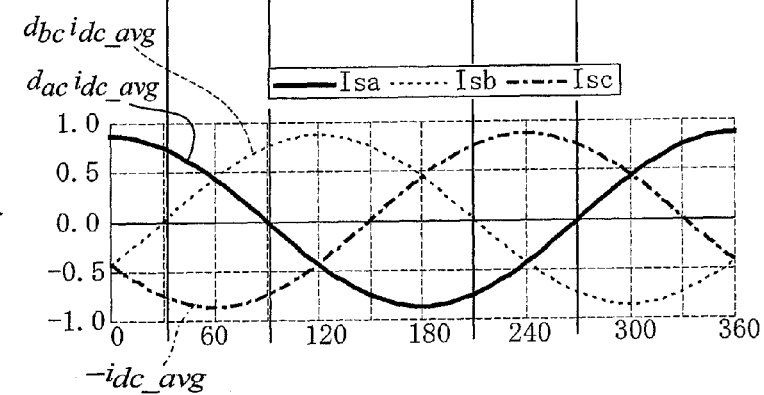
Fig.4D LINE CURRENT

Fig.6A
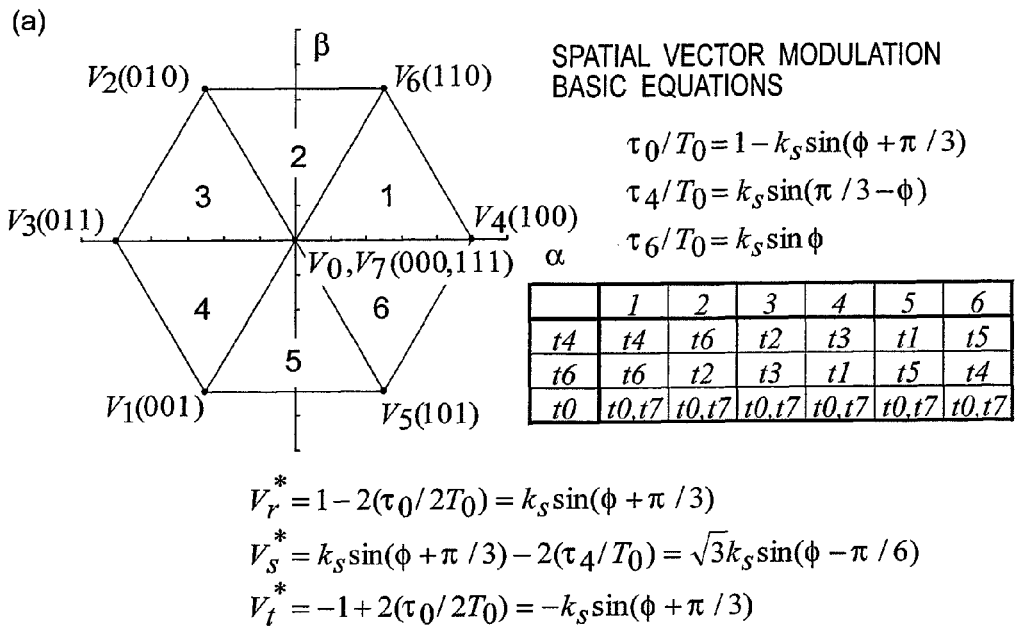
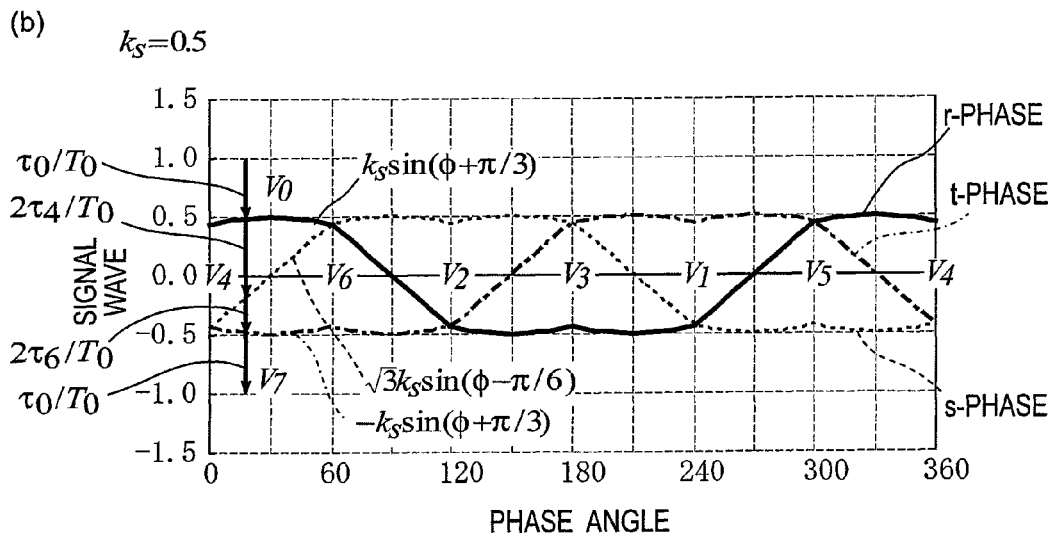

SPATIAL VECTOR MODULATION BASIC EQUATIONS $\tau_4/T_0 = (1-V_r^*)/2 = (1-\sqrt{3}\tan(\phi-\pi/6))/2$ $\tau_6/T_0 = 1-\tau_4/T_0 = (1+\sqrt{3}\tan(\phi-\pi/6))/2$ $V_{st}^* = \sqrt{3}\sin(\theta-\pi/6)/\sin(\theta+\pi/3)+1$ $$|d_s^*| = (1 - \sqrt{3}\tan(\phi - \pi/6))/2$$

$$|d_t^*| = (1 + \sqrt{3}\tan(\phi - \pi/6))/2$$

$\tau_{rt} = T_0(1 - \sqrt{3}\tan(\phi - \pi/6))/2$ $\tau_{rs} = T_0(1 + \sqrt{3}\tan(\phi - \pi/6))/2$

US 7,944,717 B2

POWER CONVERTER APPARATUS AND POWER CONVERTER APPARATUS CONTROL METHOD

CROSS-REFERENCE TO RELATED APPLICATIONS

This U.S. National stage application claims priority under 35 U.S.C. §119(a) to Japanese Patent Application Nos. 2006-116722, 2006-321687, 2006-321703 filed in Japan on Apr. 20, 2006, Nov. 29, 2006, and Nov. 29, 2006, respectively, the entire contents of which are hereby incorporated herein by reference.

TECHNICAL FIELD

The present invention relates to a power converter apparatus and a power converter apparatus control method.

BACKGROUND ART

As a typical inverter circuit construction, an indirect ac power converter circuit that converts a commercial alternating current into a direct current via a rectifying circuit and a smoothing circuit and outputs a desired alternating current by a voltage type converter is generally used. On the other hand, as a system to directly obtain an ac output from an ac voltage, a direct power converter apparatus represented by a matrix converter is known, and this obviates the need for a large-size capacitor or reactor for smoothing the voltage pulsation due to the commercial frequency. Therefore, downsizing of the converter can be expected, and the converter has attracted attention in recent years as a next-generation power converter apparatus.

As a conventional direct power converter apparatus, there has been a direct power converter apparatus having a PWM rectifier that converts a three-phase ac voltage into a dc voltage and a PWM inverter that converts the dc voltage converted by the PWM rectifier into a prescribed three-phase ac output voltage (refer to, for example, JP 2004-266972 A).

The direct power converter apparatus generates a trapezoidal waveform instruction signal on the basis of an input current instruction and compares the trapezoidal waveform instruction signal with a carrier signal to generate a PWM modulation signal for turning on and off the switching circuit of the PWM rectifier. Moreover, the direct power converter apparatus compares a triangular wave obtained by transforming the carrier signal with an output voltage instruction to generate a PWM modulation signal for turning on and off the switching circuit of the PWM inverter.

However, because the direct power converter apparatus generates the trapezoidal waveform instruction signal by calculation on the basis of an input current instruction, the direct power converter apparatus has a problem that the operational load of the control section increases.

Moreover, because the direct power converter apparatus needs to transform the carrier waveform on the PWM inverter side, the direct power converter apparatus has a problem that the modulation waveform generation is complicated, and the control circuit becomes complicated. There is a further problem that the circuit of the control section becomes complicated also when a carrier generator circuit to supply a carrier signal is separately used for the PWM rectifier and the PWM inverter.

SUMMARY OF THE INVENTION

An object of the invention is to provide a power converter apparatus and a power converter apparatus control method capable of reducing the operational load of the control section with a simple construction.

Another object of the invention is to provide a power converter apparatus and a power converter apparatus control method capable of simplifying the circuit of the control section.

In order to solve the above problems, a power converter apparatus of a first aspect of the invention comprises:

an instruction signal generating part that generates a trapezoidal waveform instruction signal on the basis of a phase angle of a reference signal;

a carrier signal generating part that generates a carrier signal; and a converting section that converts a three-phase ac input voltage into a dc voltage or converts a dc voltage into a three-phase ac output voltage on the basis of the trapezoidal waveform instruction signal from the instruction signal generating part and the carrier signal generated by the carrier signal generating part, wherein the instruction signal generating part generates a sloped region of the trapezoidal waveform instruction signal by using a prescribed table or prescribed equations.

In this case, as the reference signal in generating the trapezoidal waveform instruction signal by the instruction signal generating part, the signal that becomes the reference of the three-phase ac input voltages is used when the converting section converts the three-phase ac input voltage into the dc voltage, and the signal that becomes the reference for producing, for example, the three-phase ac output voltage is used when the converting section converts the dc voltage into the three-phase ac output voltage.

According to the above construction, by generating the sloped region of the trapezoidal waveform instruction signal by the instruction signal generating part using the prescribed table or the prescribed equation, the trapezoidal waveform instruction signal needs not be formed by complicated calculation, and the operational load of the control section can be reduced with a simple construction.

Moreover, a power converter apparatus of a second aspect of the invention comprises:

a power converter apparatus, which has a converter section that converts a three-phase ac input voltage into a dc voltage and an inverter section that converts the dc voltage converted by the converter section into a prescribed three-phase ac output voltage and which has no smoothing filter in a dc link portion that connects the converter section with the inverter section, the apparatus comprising:

a converter section instruction signal generating part that generates a converter section instruction signal of a trapezoidal waveform synchronized with the three-phase ac input voltage;

a carrier signal generating part that generates a carrier signal;

an inverter section instruction signal generating part that generates an inverter section instruction signal for outputting the prescribed three-phase ac output voltage; and a instruction signal correcting part that corrects the inverter section instruction signal generated by the inverter section instruction signal generating part on the basis of the converter section instruction signal of the trapezoidal waveform from the converter section instruction signal generating part, wherein the converter section converts the three-phase ac input voltage into the dc voltage on the basis of the converter section instruction signal of the trapezoidal waveform from the converter section instruction signal generating part and the carrier signal from the carrier signal generating part, the inverter section converts the dc voltage converted by the converter section into the prescribed three-phase ac output voltage on the basis of the inverter section instruction signal corrected by the instruction signal correcting part, and the converter section instruction signal generating part generates a sloped region of the converter section instruction signal of the trapezoidal waveform by using a prescribed table or prescribed equations.

According to the above construction, by correcting the inverter section instruction signal by the instruction signal correcting part so that no distortion occurs in the three-phase ac output voltage (current) with respect to the pulsating voltage (current) waveform of the dc voltage converted by the converter section, the dc voltage converted by the converter section can be converted into the prescribed three-phase ac output voltage on the basis of the corrected inverter section instruction signal. In this case, by generating the sloped region of the converter section instruction signal of the trapezoidal waveform by the converter section instruction signal generating part using the prescribed table or the prescribed equation, the converter section instruction signal of the trapezoidal waveform needs not be formed by complicated calculation, and the operational load of the control section can be reduced with a simple construction.

In an embodiment, the prescribed equations are:

$$\sqrt{3}\tan(\phi-\pi/6)$$

(provided that the phase angle $\phi$ is $0 \leqq \phi \leqq \pi/3$) and $$-\sqrt{3}\tan(\phi-\pi/6)$$

(provided that the phase angle $\phi$ is $\pi \leqq \phi \leqq 4\pi/3$).

According to the above embodiment, by generating the converter section instruction signal of the trapezoidal waveform by the converter section instruction signal generating part using the prescribed equation, the three-phase ac output voltage (current) free of distortion can reliably be obtained while reducing the operational load.

An embodiment comprises:

a converter section PWM modulation signal generating part that compares the converter section instruction signal from the converter section instruction signal generating part with the carrier signal from the carrier signal generating part and generates a converter section PWM modulation signal; and an inverter section PWM modulation signal generating part that compares the inverter section instruction signal from the inverter section instruction signal generating part with the carrier signal identical to that used for the converter section and generates an inverter section PWM modulation signal, wherein the converter section converts the three-phase ac input voltage into the dc voltage on the basis of the converter section PWM modulation signal generated by the converter section PWM modulation signal generating part, and the inverter section converts the dc voltage converted by the converter section into the prescribed three-phase ac output voltage on the basis of the inverter section PWM modulation signal generated by the inverter section PWM modulation signal generating part.

According to the above embodiment, the circuit of the control section can be simplified by enabling the PWM modulation by one carrier signal common to the converter section and the inverter section.

In accordance with one aspect of the present invention, the carrier signal is a signal of a triangular waveform.

According to the above embodiment, the circuit for the pulse width modulation can be simplified by using the signal of the triangular waveform suitable for the PWM modulation for the carrier signal.

In accordance with one aspect of the present invention, the carrier signal is a signal of a sawtooth waveform.

According to the above embodiment, the carrier generation and the modulation processing can be simplified by using the signal of the sawtooth waveform for the carrier signal.

In accordance with one aspect of the present invention, the converter section comprises:

three switching circuits having one terminal to which respective phase voltages of the three-phase ac input voltage are inputted and the other terminal connected to a first dc link portion; and three switching circuits having one terminal to which respective phase voltages of the three-phase ac input voltage are inputted and the other terminal connected to a second dc link portion, and the inverter section comprises:

three switching circuits having one terminal connected to respective output terminals of the prescribed three-phase ac output voltage and the other terminal connected to the first dc link portion; and three switching circuits having one terminal connected to respective output terminals of the prescribed three-phase ac output voltage and the other terminal connected to the second dc link portion.

An embodiment is a matrix converter having a virtual converter section corresponding to the converter section, a virtual inverter section corresponding to the inverter section, and a virtual dc link portion corresponding to the dc link portion, wherein the virtual converter section and the virtual inverter section comprises:

three switching circuits having one terminal to which a first phase voltage of the three-phase ac input voltages is inputted and the other terminal connected to respective output terminals of the prescribed three-phase ac output voltage;

three switching circuits having one terminal to which a second phase voltage of the three-phase ac input voltages is inputted and the other terminal connected to respective output terminals of the prescribed three-phase ac output voltage; and three switching circuits having one terminal to which a third phase voltage of the three-phase ac input voltages is inputted and the other terminal connected to respective output terminals of the prescribed three-phase ac output voltage.

Moreover, in accordance with one aspect of the present invention, in the power converter apparatus of the first aspect of the invention, the instruction signal generating part generates a sloped region of the trapezoidal waveform instruction signal on the basis of:

$$|d_s^*|=(1-\sqrt{3}\tan(\phi-\pi/6))/2$$

$$|d_t^*|=(1+\sqrt{3}\tan(\phi-\pi/6))/2$$

(provided that $d_s^*$ and $d_t^*$ are line current flow ratios, and the phase angle $\phi$ is $0 \leqq \phi \leqq \pi/3$).

In this case, as the reference signal in generating the trapezoidal waveform instruction signal by the instruction signal generating part, the signal that becomes the reference of the three-phase ac input voltages is used when the converting section converts the three-phase ac input voltage into the dc voltage, and the signal that becomes the reference for producing, for example, the three-phase ac output voltage is used when the converting section converts the dc voltage into the three-phase ac output voltage.

According to the above embodiment, by generating the sloped region of the trapezoidal waveform instruction signal by the instruction signal generating part on the basis of:

$$|d_s^*|=(1-\sqrt{3}\tan(\phi-\pi/6))/2$$

$$|d_t^*|=(1+\sqrt{3}\tan(\phi-\pi/6))/2$$

(provided that $d_s^*$ and $d_t^*$ are flow ratios, and the phase angle $\phi$ is $0 \leq \phi \leq \pi/3$), the trapezoidal waveform instruction signal needs not be formed by complicated calculation, and the operational load of the control section can be reduced with a simple construction.

Moreover, in accordance with one aspect of the present invention, in the power converter apparatus of the second aspect of the invention, the converter section instruction signal generating part generates a sloped region of the trapezoidal waveform instruction signal on the basis of:

$$|d_s^*|=(1-\sqrt{3}\tan(\phi-\pi/6))/2$$

$$|d_t^*|=(1+\sqrt{3}\tan(\phi-\pi/6))/2$$

(provided that $d_s^*$ and $d_t^*$ are line current flow ratios, and the phase angle $\phi$ is $0 \leq \phi \leq \pi/3$).

According to the above embodiment, by correcting the inverter section instruction signal by the instruction signal correcting part so that no distortion occurs in the three-phase ac output voltage (current) with respect to the pulsating voltage (current) waveform of the dc voltage converted by the converter section, the dc voltage converted by the converter section can be converted into the prescribed three-phase ac output voltage on the basis of the corrected inverter section instruction signal. In this case, by generating the sloped region of the converter section instruction signal of the trapezoidal waveform by the converter section instruction signal generating part on the basis of:

$$|d_s^*|=(1-\sqrt{3}\tan(\phi-\pi/6))/2$$

$$|d_t^*|=(1+\sqrt{3}\tan(\phi-\pi/6))/2$$

(provided that $d_s^*$ and $d_t^*$ are line current flow ratios, and the phase angle $\phi$ is $0 \leq \phi \leq \pi/3$), the converter section instruction signal of the trapezoidal waveform needs not be formed by complicated calculation, and the operational load of the control section can be reduced with a simple construction.

In accordance with one aspect of the present invention, the converter section comprises:

three switching circuits having one terminal to which respective phase voltages of the three-phase ac input voltage are inputted and the other terminal connected to a first dc link portion; and three switching circuits having one terminal to which respective phase voltages of the three-phase ac input voltage are inputted and the other terminal connected to a second dc link portion, and the inverter section comprises:

three switching circuits having one terminal connected to respective output terminals of the prescribed three-phase ac output voltage and the other terminal connected to the first dc link portion; and three switching circuits having one terminal connected to respective output terminals of the prescribed three-phase ac output voltage and the other terminal connected to the second dc link portion.

An embodiment is a matrix converter having a virtual converter section corresponding to the converter section, a virtual inverter section corresponding to the inverter section, and a virtual dc link portion corresponding to the dc link portion, wherein the virtual converter section and the virtual inverter section comprises:

three switching circuits having one terminal to which a first phase voltage of the three-phase ac input voltages is inputted and the other terminal connected to respective output terminals of the prescribed three-phase ac output voltage;

three switching circuits having one terminal to which a second phase voltage of the three-phase ac input voltages is inputted and the other terminal connected to respective output terminals of the prescribed three-phase ac output voltage; and three switching circuits having one terminal to which a third phase voltage of the three-phase ac input voltages is inputted and the other terminal connected to respective output terminals of the prescribed three-phase ac output voltage.

Moreover, a power converter apparatus of a third aspect of the invention comprises:

a converter section instruction signal generating part that generates a converter section instruction signal synchronized with a three-phase ac input voltage;

an inverter section instruction signal generating part that generates an inverter section instruction signal for outputting a prescribed three-phase ac output voltage;

a carrier signal generating part that generates a carrier signal;

a converter section that converts the three-phase ac input voltage into a dc voltage on the basis of the converter section instruction signal from the converter section instruction signal generating part and the carrier signal generated by the carrier signal generating part; and an inverter section that converts the dc voltage converted by the converter section into the prescribed three-phase ac output voltage on the basis of the inverter section instruction signal from the inverter section instruction signal generating part and the carrier signal identical to that used for the converter section.

According to the above construction, the circuit of the control section can be simplified by enabling the PWM modulation by one carrier signal common to the converter section and the inverter section.

In accordance with one aspect of the present invention, the carrier signal is a signal of a triangular waveform.

According to the above embodiment, the circuit for the pulse width modulation can be simplified by using the signal of the triangular waveform suitable for the PWM modulation for the carrier signal.

In accordance with one aspect of the present invention, the carrier signal is a signal of a sawtooth waveform.

According to the above embodiment, the carrier generation and the modulation processing can be simplified by using the signal of the sawtooth waveform for the carrier signal.

Moreover, according to a fourth aspect of the invention, there is provided a power converter apparatus control method comprising the steps of:

generating a trapezoidal waveform instruction signal by an instruction signal generating part;

generating a carrier signal by a carrier signal generating part;

converting a three-phase ac input voltage into a dc voltage or converting a dc voltage into a three-phase ac output voltage by a converting section on the basis of the trapezoidal waveform instruction signal from the instruction signal generating part and the carrier signal generated by the carrier signal generating part, wherein a sloped region of the trapezoidal waveform instruction signal is generated by using a prescribed table or prescribed equations in the step of generating the trapezoidal waveform instruction signal by the instruction signal generating part.

According to the above construction, by generating the sloped region of the converter section instruction signal of the trapezoidal waveform by the instruction signal generating part using the prescribed table or the prescribed equation, the trapezoidal waveform instruction signal needs not be formed by complicated calculation, and the operational load of the control section can be reduced with a simple construction.

Moreover, according to a fifth aspect of the invention, there is provided a power converter apparatus control method for a power converter apparatus which has a converter section that converts a three-phase ac input voltage into a dc voltage and an inverter section that converts the dc voltage converted by the converter section into a prescribed three-phase ac output voltage and which has no smoothing filter in a dc link portion that connects the converter section with the inverter section, the method comprising the steps of:

generating a converter section instruction signal of a trapezoidal waveform synchronized with the three-phase ac input voltage by a converter section instruction signal generating part;

generating a carrier signal by a carrier signal generating part;

generating an inverter section instruction signal for outputting the prescribed three-phase ac output voltage by an inverter section instruction signal generating part; and correcting the inverter section instruction signal generated by the inverter section instruction signal generating part by a instruction signal correcting part on the basis of the converter section instruction signal of the trapezoidal waveform from the converter section instruction signal generating part;

converting the three-phase ac input voltage into the dc voltage by the converter section on the basis of the converter section instruction signal of the trapezoidal waveform from the converter section instruction signal generating part and the carrier signal from the carrier signal generating part; and converting the dc voltage converted by the converter section into the prescribed three-phase ac output voltage by the inverter section on the basis of the inverter section instruction signal corrected by the instruction signal correcting part, wherein a sloped region of the converter section instruction signal of the trapezoidal waveform is generated by using a prescribed table or prescribed equations in the step of generating the converter section instruction signal of the trapezoidal waveform by the converter section instruction signal generating part.

According to the above construction, by correcting the inverter section instruction signal by the instruction signal correcting part so that no distortion occurs in the three-phase ac output voltage (current) with respect to the pulsating voltage (current) waveform of the dc voltage converted by the converter section, the dc voltage converted by the converter section can be converted into the prescribed three-phase ac output voltage on the basis of the corrected inverter section instruction signal. In this case, by generating the sloped region of the converter section instruction signal of the trapezoidal waveform by the converter section instruction signal generating part using the prescribed table or the prescribed equation, the converter section instruction signal of the trapezoidal waveform needs not be formed by complicated calculation, and the operational load of the control section can be reduced with a simple construction.

In accordance with one aspect of the present invention, the prescribed equations are:

$$\sqrt{3}\tan(\phi-\pi/6)$$

(provided that the phase angle $\phi$ is $0 \leq \phi \leq \pi/3$) and $$-\sqrt{3}\tan(\phi-\pi/6)$$

(provided that the phase angle $\phi$ is $\pi \leq \phi \leq 4\pi/3$).

According to the above embodiment, by generating the converter section instruction signal of the trapezoidal waveform by the converter section instruction signal generating part using the prescribed equation, the three-phase ac output voltage (current) free of distortion can reliably be obtained while reducing the operational load.

Moreover, in accordance with one aspect of the present invention, in the power converter apparatus control method of the fifth aspect of the invention, a sloped region of the converter section instruction signal of the trapezoidal waveform is generated on the basis of:

$$|d_s^*|=(1-\sqrt{3}\tan(\phi-\pi/6))/2$$

$$|d_t^*|=(1+\sqrt{3}\tan(\phi-\pi/6))/2$$

(provided that $d_s^*$ and $d_t^*$ are line current flow ratios, and the phase angle $\phi$ is $0 \leq \phi \leq \pi/3$) in the step of generating the converter section instruction signal of the trapezoidal waveform by the converter section instruction signal generating part.

According to the above embodiment, by correcting the inverter section instruction signal by the instruction signal correcting part so that no distortion occurs in the three-phase ac output voltage (current) with respect to the pulsating voltage (current) waveform of the dc voltage converted by the converter section, the dc voltage converted by the converter section can be converted into the prescribed three-phase ac output voltage on the basis of the corrected inverter section instruction signal. In this case, by generating the sloped region of the converter section instruction signal of the trapezoidal waveform by the converter section instruction signal generating part on the basis of:

$$|d_s^*|=(1-\sqrt{3}\tan(\phi-\pi/6))/2$$

$$|d_t^*|=(1+\sqrt{3}\tan(\phi-\pi/6))/2$$

(provided that $d_s^*$ and $d_t^*$ are flow ratios, and the phase angle $\phi$ is $0 \leq \phi \leq \pi/3$), the converter section instruction signal of the trapezoidal waveform needs not be formed by complicated calculation, and the operational load of the control section can be reduced with a simple construction.

Moreover, according to a sixth aspect of the invention, there is provided a power converter apparatus control method comprising the steps of:

generating a converter section instruction signal synchronized with a three-phase ac input voltage by a converter section instruction signal generating part;

generating an inverter section instruction signal for outputting a prescribed three-phase ac output voltage by an inverter section instruction signal generating part;

generating a carrier signal by a carrier signal generating part;

converting the three-phase ac input voltage into the dc voltage by a converter section on the basis of the converter section instruction signal from the converter section instruction signal generating part and the carrier signal generated by the carrier signal generating part; and converting the dc voltage converted by the converter section into the prescribed three-phase ac output voltage by the inverter section on the basis of the inverter section instruction signal from the inverter section instruction signal generating part and the carrier signal identical to that used for the converter section.

According to the above construction, the circuit of the control section can be simplified by enabling the PWM modulation by one carrier signal common to the converter section and the inverter section.

Moreover, according to a seventh aspect of the invention, there is provided a power converter apparatus comprising:

a PWM modulation signal generating part that generates a PWM modulation signal by a spatial vector modulation system; and a converting section that converts a three-phase ac input voltage into a dc voltage or converts a dc voltage into a three-phase ac output voltage on the basis of the PWM modulation signal from the PWM modulation signal generating part, wherein, assuming that the carrier period is $T_0$ and the phase angle is $\phi$, then the PWM modulation signal generating part generates the PWM modulation signal by using voltage vectors to be outputted based on the spatial vector modulation system on the basis of voltage vectors at output times $\tau 4$, $\tau 6$ expressed by:

$$\tau_4 = T_0(1-\sqrt{3}\tan(\phi-\pi/6))/2$$

$$\tau_6 = T_0(1+\sqrt{3}\tan(\phi-\pi/6))/2$$

(provided that $0 \leq \phi \leq \pi/3$).

According to the above construction, assuming that the carrier period is $T_0$ and the phase angle is $\phi$, then the instruction signal generating part generates the PWM modulation signal by using the voltage vector to be outputted based on the spatial vector modulation system on the basis of the voltage vectors at the output times $\tau 4$, $\tau 6$ expressed by:

$$\tau_4 = T_0(1-\sqrt{3}\tan(\phi-\pi/6))/2$$

$$\tau_6 = T_0(1+\sqrt{3}\tan(\phi-\pi/6))/2$$

(provided that $0 \leq \phi \leq \pi/3$). By this operation, the instruction signal needs not be formed by complicated calculation, and the operational load of the control section can be reduced with a simple construction.

Moreover, according to an eighth aspect of the invention, there is provided a power converter apparatus, which has a converter section that converts a three-phase ac input voltage into a dc voltage and an inverter section that converts the dc voltage converted by the converter section into a prescribed three-phase ac output voltage and which has no smoothing filter in a dc link portion that connects the converter section with the inverter section, the apparatus comprising:

a converter section PWM modulation signal generating part that generates a converter section PWM modulation signal synchronized with the three-phase ac input voltage by a spatial vector modulation system;

an inverter section PWM modulation signal generating part that generates an inverter section PWM modulation signal for outputting the prescribed three-phase ac output voltage; and a PWM modulation signal correcting part that corrects the inverter section PWM modulation signal generated by the inverter section PWM modulation signal generating part on the basis of the converter section PWM modulation signal from the converter section PWM modulation signal generating part, wherein the converter section converts the three-phase ac input voltage into the dc voltage on the basis of the converter section PWM modulation signal from the converter section PWM modulation signal generating part, the inverter section converts the dc voltage converted by the converter section into the prescribed three-phase ac output voltage on the basis of the inverter section PWM modulation signal corrected by the PWM modulation signal correcting part, and, assuming that the carrier period is $T_0$ and the phase angle is $\phi$, then the converter section PWM modulation signal generating part generates the converter section PWM modulation signal by using voltage vectors to be outputted based on the spatial vector modulation system on the basis of voltage vectors at output times $\tau 4$, $\tau 6$ expressed by:

$$\tau_4 = T_0(1-\sqrt{3}\tan(\phi-\pi/6))/2$$

$$\tau_6 = T_0(1+\sqrt{3}\tan(\phi-\pi/6))/2$$

(provided that $0 \leq \phi \leq \pi/3$).

According to the above construction, the dc voltage converted by the converter section is converted into the prescribed three-phase ac output voltage on the basis of the inverter section instruction signal corrected by the instruction signal correcting part so that no distortion occurs in the three-phase ac output voltage (current) with respect to the pulsating voltage (current) waveform of the dc voltage converted by the converter section. In this case, assuming that the carrier period is $T_0$ and the phase angle is $\phi$, then the converter section instruction signal generating part generates the converter section PWM modulation signal by using the voltage vector to output the dc voltage based on the spatial vector modulation system on the basis of the voltage vectors at the output times $\tau 4$, $\tau 6$ expressed by:

$$\tau_4/T_0 = (1-\sqrt{3}\tan(\phi-\pi/6))/2$$

$$\tau_6/T_0 = (1+\sqrt{3}\tan(\phi-\pi/6))/2$$

(provided that $0 \leq \phi \leq \pi/3$). By this operation, the instruction signal needs not be formed by complicated calculation, and the operational load of the control section can be reduced with a simple construction.

Moreover, according to a ninth aspect of the invention, there is provided a power converter apparatus comprising:

a PWM modulation signal generating part that generates a PWM modulation signal by a spatial vector modulation system; and a converting section that converts a three-phase ac input voltage into a dc voltage or converts a dc voltage into a three-phase ac output voltage on the basis of the PWM modulation signal from the PWM modulation signal generating part, wherein, assuming that the carrier period is $T_0$ and the phase angle is $\phi$, then the PWM modulation signal generating part generates the PWM modulation signal by using current vectors to be outputted based on the spatial vector modulation system on the basis of current vectors at output times $\tau_{rs}$, $\tau_{rt}$ expressed by:

$$\tau_{rs} = T_0(1-\sqrt{3}\tan(\phi-\pi/6))/2$$

$$\tau_{rt} = T_0(1+\sqrt{3}\tan(\phi-\pi/6))/2$$

(provided that $0 \leq \phi \leq \pi/3$).

According to the above construction, assuming that the carrier period is $T_0$ and the phase angle is $\phi$, then the instruction signal generating part generates the PWM modulation signal by using the voltage vector to be outputted based on the spatial vector modulation system on the basis of the current vectors at the output times $\tau_{rs}, \tau_{rt}$ expressed by:

$$\tau_{rs} = T_0(1-\sqrt{3}\tan(\phi-\pi/6))/2$$

$$\tau_{rt} = T_0(1+\sqrt{3}\tan(\phi-\pi/6))/2$$

(provided that $0 \leq \phi \leq \pi/3$). By this operation, the instruction signal needs not be formed by complicated calculation, and the operational load of the control section can be reduced with a simple construction.

Moreover, according to a tenth aspect of the invention, there is provided a power converter apparatus, which has a converter section that converts a three-phase ac input voltage into a dc voltage and an inverter section that converts the dc voltage converted by the converter section into a prescribed three-phase ac output voltage and which has no smoothing filter in a dc link portion that connects the converter section with the inverter section, the apparatus comprising:

a converter section PWM modulation signal generating part that generates a converter section PWM modulation signal synchronized with the three-phase ac input voltage by a spatial vector modulation system;

an inverter section PWM modulation signal generating part that generates an inverter section PWM modulation signal for outputting the prescribed three-phase ac output voltage; and a PWM modulation signal correcting part that corrects the inverter section PWM modulation signal generated by the inverter section PWM modulation signal generating part on the basis of the converter section PWM modulation signal from the converter section PWM modulation signal generating part, wherein the converter section converts the three-phase ac input voltage into the dc voltage on the basis of the converter section PWM modulation signal from the converter section PWM modulation signal generating part, the inverter section converts the dc voltage converted by the converter section into the prescribed three-phase ac output voltage on the basis of the inverter section PWM modulation signal corrected by the PWM modulation signal correcting part, and, assuming that the carrier period is $T_0$ and the phase angle is $\phi$, then the converter section PWM modulation signal generating part generates the converter section PWM modulation signal by using current vectors to be outputted based on the spatial vector modulation system on the basis of current vectors at output times $\tau_{rs}, \tau_{rt}$ expressed by:

$$\tau_{rs} = T_0(1-\sqrt{3}\tan(\phi-\pi/6))/2$$

$$\tau_{rt} = T_0(1+\sqrt{3}\tan(\phi-\pi/6))/2$$

(provided that $0 \leq \phi \leq \pi/3$).

According to the above construction, the dc voltage converted by the converter section is converted into the prescribed three-phase ac output voltage on the basis of the inverter section instruction signal corrected by the instruction signal correcting part so that no distortion occurs in the three-phase ac output voltage (current) with respect to the pulsating voltage (current) waveform of the dc voltage converted by the converter section. In this case, assuming that the carrier period is $T_0$ and the phase angle is $\phi$, then the converter section instruction signal generating part generates the converter section PWM modulation signal by using the voltage vector to output the dc voltage based on the spatial vector modulation system on the basis of the current vectors at output times $\tau_{rs}, \tau_{rt}$ expressed by:

$$\tau_{rs} = T_0(1-\sqrt{3}\tan(\phi-\pi/6))/2$$

$$\tau_{rt} = T_0(1+\sqrt{3}\tan(\phi-\pi/6))/2$$

(provided that $0 \leq \phi \leq \pi/3$). By this operation, the instruction signal needs not be formed by complicated calculation, and the operational load of the control section can be reduced with a simple construction.

As is apparent from the above, according to the power converter apparatus and the power converter apparatus control method of the invention, by generating the sloped region of the trapezoidal waveform instruction signal used for the PWM modulation in the converter section or the inverter section by using the prescribed table or the prescribed equation, the operational load of the control section can be reduced with a simple construction.

Moreover, according to the power converter apparatus of the invention, the circuit of the control section can be simplified by enabling the PWM modulation by one carrier signal common to the converter section and the inverter section.

Moreover, according to the power converter apparatus of the invention, assuming that the carrier period is $T_0$ and the phase angle is $\phi$, then the converter section PWM modulation signal is generated by using the voltage vector to output the dc voltage based on the spatial vector modulation system on the basis of the voltage vectors at the output times $\tau 4, \tau 6$ expressed by:

$$\tau_4/T_0 = (1-\sqrt{3}\tan(\phi-\pi/6))/2$$

$$\tau_6/T_0 = (1+\sqrt{3}\tan(\phi-\pi/6))/2$$

(provided that $0 \leq \phi \leq \pi/3$). By this operation, the operational load of the control section can be reduced with a simple construction.

Moreover, according to the power converter apparatus and the power converter apparatus control method of the invention, the sloped region of the instruction signal of the trapezoidal waveform used for the converter section or the inverter section is generated on the basis of:

$$|d_s^*| = (1-\sqrt{3}\tan(\phi-\pi/6))/2$$

$$|d_t^*| = (1+\sqrt{3}\tan(\phi-\pi/6))/2$$

(provided that $d_s^*$ and $d_t^*$ are line current flow ratios, and a phase angle $\phi$ is $0 \leq \phi \leq \pi/3$). By this operation, the operational load of the control section can be reduced with a simple construction.

Moreover, according to the power converter apparatus of the invention, assuming that the carrier period is $T_0$ and the phase angle is $\phi$, then the converter section PWM modulation signal is generated by using the voltage vector to output the dc voltage based on the spatial vector modulation system on the basis of the current vectors at the output times $\tau_{rs}, \tau_{rt}$ expressed by:

$$\tau_{rs} = T_0(1-\sqrt{3}\tan(\phi-\pi/6))/2$$

$$\tau_{rt} = T_0(1+\sqrt{3}\tan(\phi-\pi/6))/2$$

(provided that $0 \leq \phi \leq \pi/3$). By this operation, the operational load of the control section can be reduced with a simple construction.

BRIEF DESCRIPTION OF THE DRAWINGS

FIGS. 4A through 4D are graphs showing the waveforms of parts for explaining the control principle of the direct conversion circuit with the dc link;

FIG. 6A is a chart for explaining spatial vector modulation;

DETAILED DESCRIPTION OF THE INVENTION

Figure 1:
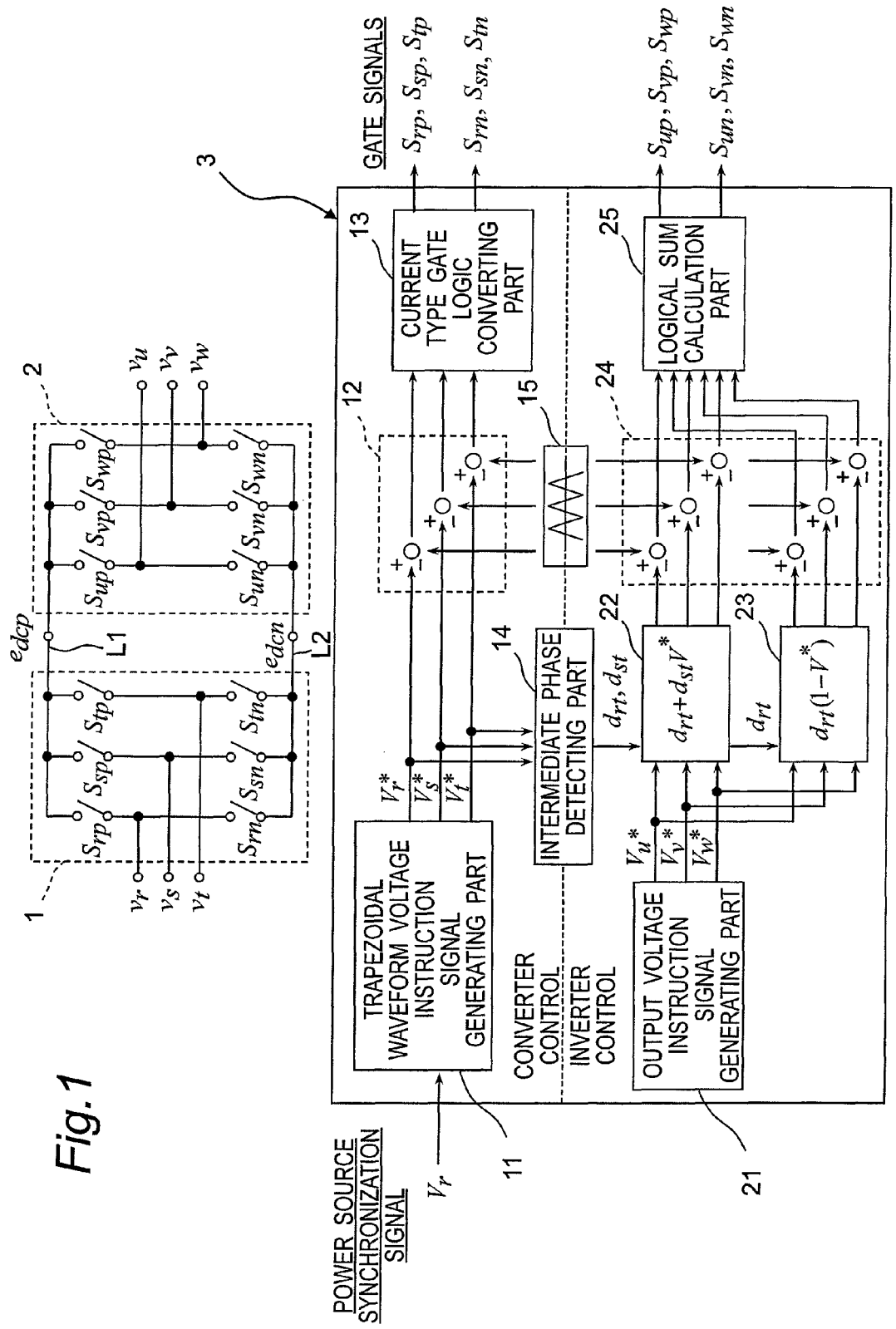
FIG. 1 is a schematic diagram of a direct power converter apparatus according to a first embodiment of the invention.

Before explaining the power converter apparatus and the power converter apparatus control method of the invention by the embodiments shown in the drawings, the features of the power converter apparatus and the power converter apparatus control method of the invention are described.

First of all, in a power converter apparatus for dc-to-ac conversion, derivation of a phase voltage signal wave capable of obtaining a sine wave output also for a pulsating voltage waveform is described as in the method of generating a phase voltage waveform capable of obtaining a line voltage of a sine waveform with respect to a constant dc voltage.

In the direct conversion circuit with the dc link described in Technical Document 1 (Lixiang Wei, Thomas. A Lipo, "A Novel Matrix Converter Topology with Simple Commutation", IEEE IAS2001, vol. 3, pp. 1749-1754. 2001), the flow ratio of the line current is controlled into a trapezoidal waveform because of the current type converter. In the specification, a line voltage is controlled to a trapezoidal waveform on the assumption that examination is made on the voltage source basis in consideration of the duality of the current type and the voltage type (corresponding to line current:line voltage, phase current:phase voltage).

Figure 3:
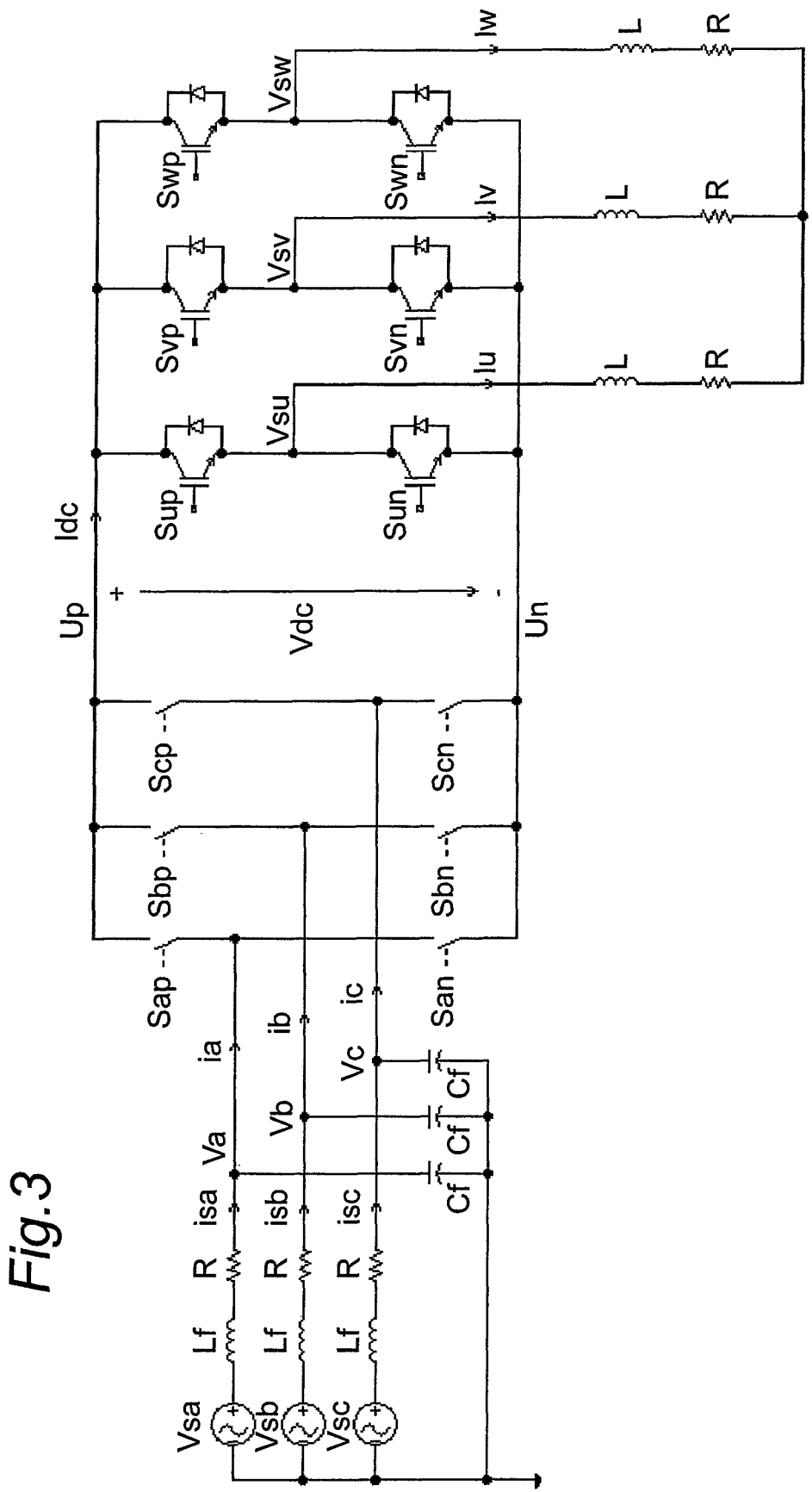
FIG. 3 is a schematic diagram of a direct conversion circuit with a dc link.

The Technical Document 1 is related to the modulation system of the direct conversion circuit with the dc link free of smoothing and rectifying circuits in the dc link portion. As shown in FIG. 3, the direct conversion circuit with the dc link of the Technical Document 1 has a converter section constructed of six switching circuits $S_{ap}$, $S_{bp}$, $S_{cp}$, $S_{an}$, $S_{bn}$, $S_{cn}$ that constitute a three-phase bridge circuit, and an inverter section constructed of six switching circuits $S_{up}$, $S_{vp}$, $S_{wp}$, $S_{un}$, $S_{vn}$, $S_{wn}$ that constitute a three-phase bridge circuit. The converter section converts the three-phase ac input voltages $V_a$, $V_b$, $V_c$ from three-phase ac power sources $V_{sa}$, $V_{sb}$, $V_{sc}$ into direct currents. The inverter section converts a dc voltage $V_{dc}$ converted by the converter section into three-phase ac output voltages $V_{su}$, $V_{sv}$, $V_{sw}$.

FIGS. 4A through 4D show the waveforms of parts based on the control principle of the direct conversion circuit with the dc link of the Technical Document 1. As shown in FIG. 4A, because the phase voltages which correspond to either one of the two states of [two positive phases and one negative phase] and [two negative phases and one positive phase], the phase voltages can be divided into six regions every 60 degrees. In this case, a region 1 and a region 2 based on the c-phase are described. In the region 1, the c-phase of the minimum phase becomes conductive due to the switching circuit $S_{cn}$, and the a-phase and b-phase of the maximum or intermediate phases are subjected to switching so as to have the following flow ratios $d_{ac}$, $d_{bc}$ by using the switching circuits $S_{ap}$, $S_{bp}$. Likewise, in the region 2, the c-phase of the maximum phase becomes conductive due to the switching circuit $S_{cp}$, and the a-phase and b-phase of the intermediate or minimum phases are subjected to switching so as to have the following flow ratios $d_{ac}$, $d_{bc}$ by using the switching circuits $S_{an}$, $S_{bn}$.

$$d_{ac} = \frac{\cos\theta_a}{|\cos\theta_c|},$$

$$d_{bc} = \frac{\cos\theta_b}{|\cos\theta_c|}$$

If the above operation is applied to six regions, the flow ratios of the phases come to have the trapezoidal waveforms shown in FIG. 4B. In this case, the switching states of the upper arm and the lower arm on the converter side are shown. It is assumed that the upper arm becomes conductive when the flow ratio is positive and the lower arm becomes conductive when the flow ratio is negative.

In this case, as shown in FIG. 4C, it can be understood that two potentials of a line voltage Emax between the maximum phase and the minimum phase and a line voltage Emid generated in the intermediate phase between the minimum phase (region 1) and the maximum phase (region 2) can be obtained as the dc link voltage. Moreover, it can be understood that an average voltage $V_{dc}$ is expressed by:

$$V_{dc} = 3V_m/(2\cos\theta_{in}), \cos\theta_{in} = \max(|\cos\theta_a|, |\cos\theta_b|, |\cos\theta_c|)$$

by multiplying each dc link voltage by each flow ratio, and the dc link voltage comes to have a pulsating voltage waveform.

On the other hand, voltage control is performed by using the pulsating voltage $V_{dc}$ on the inverter side, and therefore, the modulation wave is controlled on the basis of:

$$t_1 = t_{10}\cos\theta_{in}, t_2 = t_{20}\cos\theta_{in}, t_0 = t_s - t_1 - t_2$$

by multiplying the electrification time by the pulsating component $\cos\theta_{in}$ for compensation for the pulsating component. Moreover, the load of the inverter can be regarded as a current source because of its inductivity, and the dc link current, which is modulated in amplitude by the pulsating component $\cos\theta_{in}$ as expressed by the above equation, becomes a pulsating current as expressed by:

$$i_{dc\_avg} = kI_o\cos\psi\cos\theta_{in}$$

In this case, the converter side has one phase in the conductive state and two phases switching at respective flow ratios dac, dbc, and therefore, the input currents in the region 1 have the relations of:

$$i_{sa} = d_{ac}i_{dc\_avg},\ i_{sb} = d_{bc}i_{dc\_avg},\ i_{sc} = -i_{dc\_avg}$$

As described above, the input currents respectively have a waveform obtained by multiplying the trapezoidal waveform flow ratio shown in FIG. 4B by the pulsating current, and therefore, are allowed to be the sine waves shown in FIG. 4D.

Figure 2:
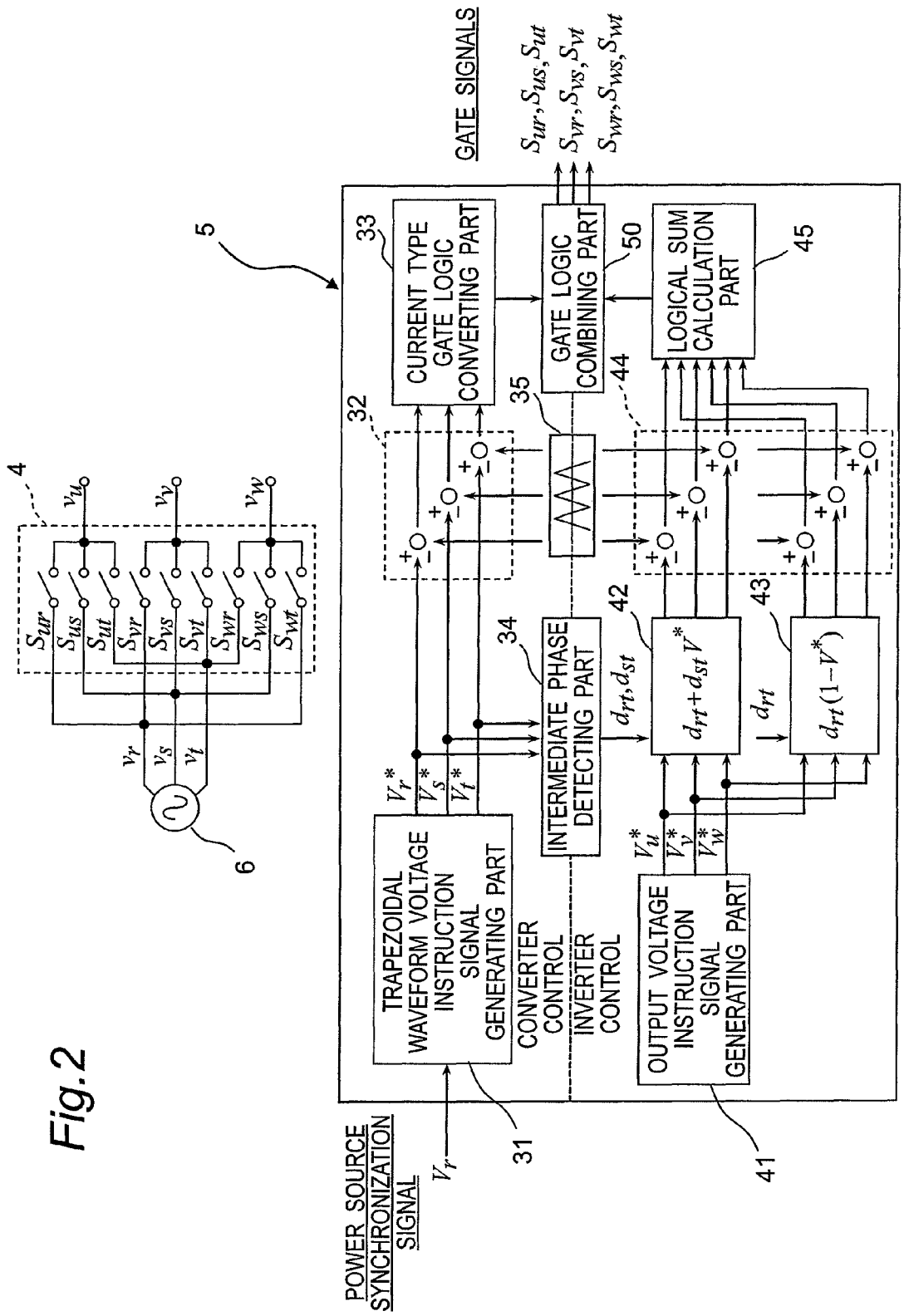
FIG. 2 is a schematic diagram of a direct power converter apparatus according to a second embodiment of the invention.

Moreover, as an inter-line voltage control method for a constant dc voltage, the signal wave shown in Technical Document 2 (JP H06-081514 B) is known (refer to Technical Document 2, line 10 in the right column on page 3 through line 25 in the left column on page 4 and FIGS. 1 and 2).

In this case, phase voltage instruction signals $V_u^*$, $V_v^*$, $V_w^*$ are expressed by:

$$V_u^* = V\cos\theta,\ V_v^* = V\cos(\theta - 2\pi/3),\ V_w^* = V\cos(\theta + 2\pi/3) \quad (1)$$

By adding a half of the intermediate phase voltage to the phase voltage instruction signals $V_u^*$, $V_v^*$, $V_w^*$ of Equation (1), phase voltage instruction signals $V_u^{}$, $V_v^{}$, $V_w^{**}$ that have mutually different polarities such that one phase is delayed by $\pi/6$ and the other two phases are advanced by $\pi/3$ are expressed by:

$$V_u^{**} = \frac{\sqrt{3}}{2}V\sin(\theta + \pi/3), \quad (2)$$

$$V_v^{**} = \frac{3}{2}V\sin(\theta - \pi/6),$$

$$V_w^{**} = -\frac{\sqrt{3}}{2}V\sin(\theta + \pi/3)$$

Although the signals are shown based on the phase of the $V_{uv}$ line voltage as a reference in Technical Document 2, the phase sequence is expressed read in a different way (W as U, U as V, V as W) since the phase voltage is served as a reference.

Moreover, a pulsating voltage $V_{link}$, which is based on the voltage type and therefore determined by the maximum value of the line voltage, is expressed by:

$$V_{link} = \max(|V_{uv}|, |V_{vw}|, |V_{wu}|) \quad (3)$$

Then, since the line voltage $V_{uw}$ comes to have a maximum value in the region of the phase angle of 0 to $\pi/3$, there holds the relational expression of:

$$V_{link} = V_{uw} = V(\cos\theta - \cos(\theta + 2\pi/3)) = \sqrt{3}V\sin(\theta + \pi/3) \quad (4)$$

In this case, by substituting Equation (4) into Equation (2), the phase voltage instruction signals $V_u^{}$, $V_v^{}$, $V_w^{**}$ are expressed by:

$$V_u^{**} = \frac{V_{link}}{2}, \quad (5)$$

$$V_v^{**} = \frac{\sqrt{3}\,V_{link}}{2}\sin(\theta - \pi/6)/\sin(\theta + \pi/3),$$

$$V_w^{**} = -\frac{V_{link}}{2}$$

If the equation is rewritten into the instruction value of the triangular wave carrier comparison base of amplitude 1, then the phase voltage instruction signals $V_u^{}$, $V_v^{}$, $V_w^{**}$ are expressed by Equation (7) from the relation between the carrier amplitude and the output voltage of the following Equation (6) and is able to be further rewritten into Equation (8).

$$\frac{V_{link}}{2} = 1 \quad (6)$$

$$V_u^{***} = 1, \quad (7)$$
$$V_v^{***} = \sqrt{3}\sin(\theta - \pi/6)/\sin(\theta + \pi/3),$$
$$V_w^{***} = -1$$

$$V_u^{***} = 1, \quad (8)$$
$$V_v^{***} = \sqrt{3}\tan(\theta - \pi/6),$$
$$V_w^{***} = -1$$

Figure 5A:
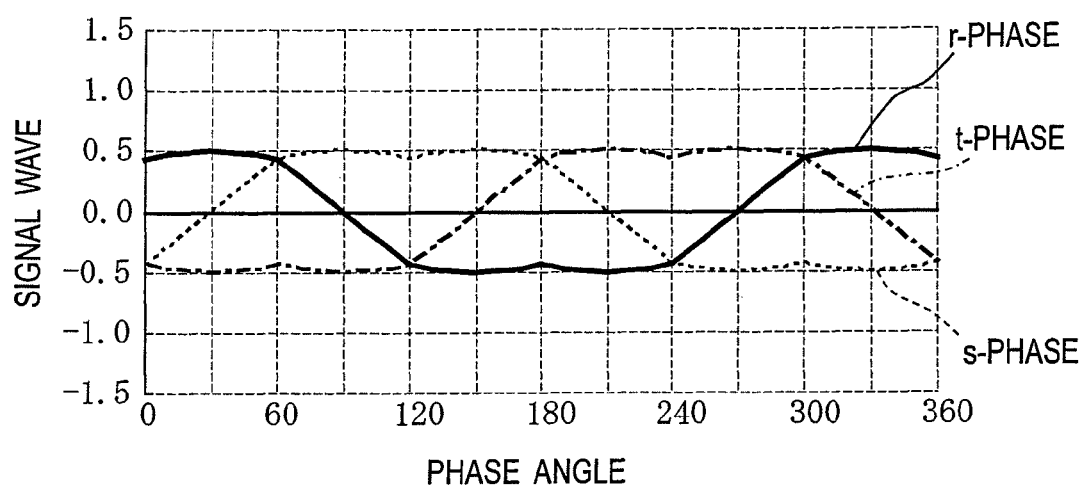
FIG. 5A is a graph showing line voltage control waveforms.
Figure 5B:
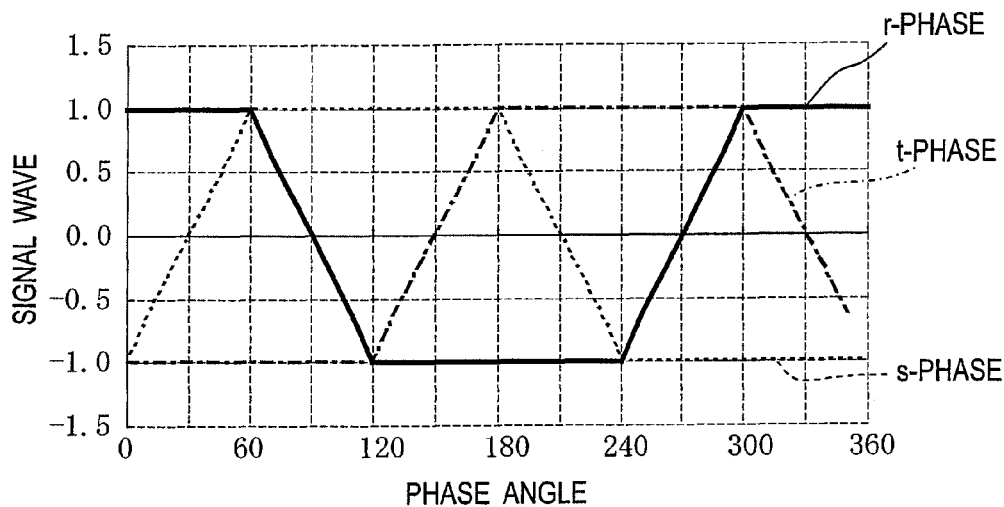
FIG. 5B is a graph showing trapezoidal modulation waveforms (phase voltages)

The above results are the same as the results of dividing the instruction value of each phase by the maximum phase voltage in the line voltage control waveform shown in FIG. 5A, and the r-phase comes to have the maximum phase voltage in the region of the phase angle of 0 to $\pi/3$. FIG. 5B is the result of carrying out similar calculations for the six regions every phase angle of $\pi/3$, and a trapezoidal modulation waveform (phase voltage) of 120-degree electrification.

Therefore, by generating the sloped region of the trapezoidal instruction signal (trapezoidal modulation waveform of 120-degree electrification) used for the PWM modulation of the converter section or the inverter section by using a prescribed table or prescribed equations by the power converter apparatus and the power converter apparatus control method of the invention, the operational load of the control section can be reduced with a simple construction.

Next, it is proved that the thus-obtained trapezoidal modulation waveform is equivalent to the line current instruction described in Technical Document 1. Since the line current of the current type corresponds to the line voltage of the voltage type, the line current instruction signals of FIG. 4B are compared with the trapezoidal modulation waveforms (line voltages) of FIG. 5C.

In FIG. 4B, the b-phase line current instruction signal $d_{bc}$ is expressed by:

$$d_{bc} = -\cos\theta_b/\cos\theta_c \quad (9)$$

and if expressed by the phase angle of 0 to $\pi/3$ in the region 1, then it is rewritten into:

$$d_{bc} = \sin\theta/\sin(\theta + \pi/3) \quad (10)$$

Figure 5C:
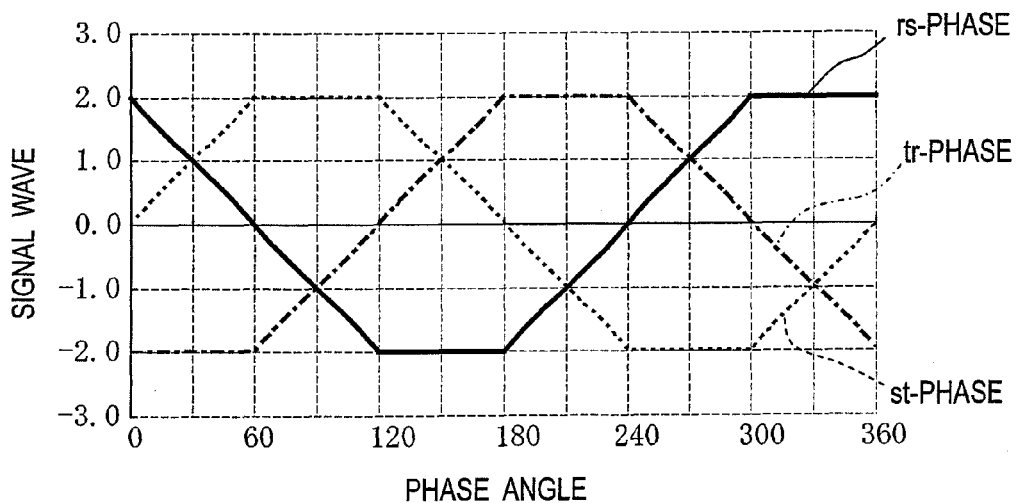
FIG. 5C is a graph showing trapezoidal modulation waveforms (line voltages)

Moreover, if the line voltage instruction of FIG. 5C is made to coincide with the line current instruction signal of FIG. 4B in amplitude, it can be expressed by:

$$V_{st}^* = (\sqrt{3}\sin(\theta - \pi/6)/\sin(\theta + \pi/3) + 1)/2 \quad (11)$$

and assuming that it is equal to Equation (10), then the equation:

$$2\sin\theta = (\sqrt{3}\sin(\theta-\pi/6)+\sin(\theta+\pi/3)) \quad (12)$$

is required to hold according to Equation (11). If the right member of Equation (12) is transformed by using the addition theorem, then there holds:

$$\sqrt{3}\sin(\theta-\pi/6)+\sin(\theta+n/3) = \sqrt{3}\left(\frac{\sqrt{3}}{2}\sin\theta - \frac{1}{2}\cos\theta\right) + \left(\frac{1}{2}\sin\theta + \frac{\sqrt{3}}{2}\cos\theta\right) \quad (13)$$

$$= 2\sin\theta$$

Therefore, the line voltage instruction signal generated by the power converter apparatus control method of the invention is equivalent to the line current instruction shown in Technical Document 1. Therefore, by applying, for example, the logical operation based on the duality (refer to Table 1 of Technical Document 3) of the voltage type and the current type shown in, for example, Technical Document 3 (Takaharu Takeshita and two others, "PWM Scheme for Current Source Three-Phase Inverters and Converters", Trans. Inst. Elect. Engnr. Jpn. D, Vol. 116, No. 1, 1996), the current type PWM pattern can easily be generated from the voltage type.

The method of generating the phase voltage instruction signal has been described above. With regard to the PWM modulation system, the method can also be applied to a power converter apparatus of a spatial vector modulation system that uses a voltage vector besides the system with the triangular waveform carrier signal.

The upper part (a) of FIG. 6A shows a vector diagram showing the spatial vectors of PWM modulation in the spatial vector modulation system and a chart showing the voltage vectors in FIG. 5A. With regard to the voltage vectors as shown in the vector diagram, six states ($V_1$-$V_6$) of eight states are vectors that are not zero, and the remaining two states ($V_0$, $V_7$) are in the state of zero.

In the spatial vector modulation system, assuming that the output times of the voltage vectors are $\tau_0$, $\tau_4$, $\tau_6$ when the phase angle $\phi$ is 0 to $\pi/3$ and the voltage control factor is ks, then the basic equations of the voltage vector are expressed by:

$$\tau_0/T_0 = 1 - k_s \sin(\phi+\pi/3)$$

$$\tau_4/T_0 = k_s \sin(\pi/3-\phi)$$

$$\tau_6/T_0 = k_s \sin\phi$$

The voltage instruction signals $V_r^*$, $V_s^*$, $V_t^*$ at the phase angle of 0 to $\pi/3$ are expressed by:

$$V_r^* = 1-2(\tau_0/2T_0) = k_s \sin(\phi+\pi/3)$$

$$V_s^* = k_s \sin(\phi+\pi/3) - 2(\tau_4/T_0) = \sqrt{3}k_s \sin(\phi-\pi/6)$$

$$V_t^* = -1+2(\tau_0/2T_0) = -k_s \sin(\phi+\pi/3)$$

The lower part (b) of FIG. 6A shows voltage vectors corresponding to the phase angle of 0 to $\pi/3$ in the line voltage control waveform of FIG. 5A. It is noted that the voltage control factor ks is set to 0.5 in FIG. 6A. In this case, an intermediate phase voltage $V_{s\_mid}^*$ of the voltage instruction signals $V_s^*$, $V_t^*$ when the phase angle $\phi$ is 0 to $\pi/3$ is expressed by:

$$V_{s\_mid}^* = V_s^*/V_r^*$$

$$= \sqrt{3}\,k_s\sin(\phi-\pi/6)/k_s\sin(\phi+\pi/3)$$

$$= \sqrt{3}\tan(\phi-\pi/6)$$

Figure 6B:
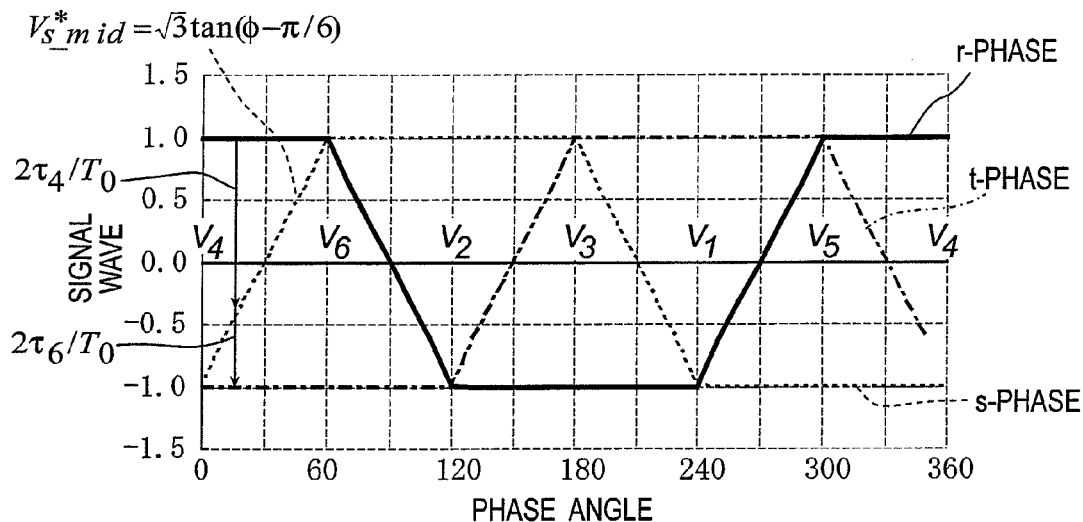
FIG. 6B is a graph showing trapezoidal modulation waveforms (phase voltages) by the spatial vector modulation.

As shown in FIG. 6B, the voltage vectors corresponding to the phase angle of 0 to $\pi/3$ are shown in the trapezoidal modulation waveforms (phase voltages) of FIG. 5B. Then, $\tau_4/T_0$ and $\tau_6/T_0$ of the basic equations of the spatial vector modulation system are expressed by:

$$\tau_4/T_0(1-V_r^*)/2 = (1-\sqrt{3}\tan(\phi-\pi/6))/2$$

$$\tau_6/T_0 1 - \tau_4/T_0 = (1+\sqrt{3}\tan(\phi-\pi/6))/2$$

By determining the output times of the voltage vectors by reading the basic equations every phase angle of $\pi/3$ in the table of FIG. 6A, the PWM waveform generation can be performed.

Figure 6C:
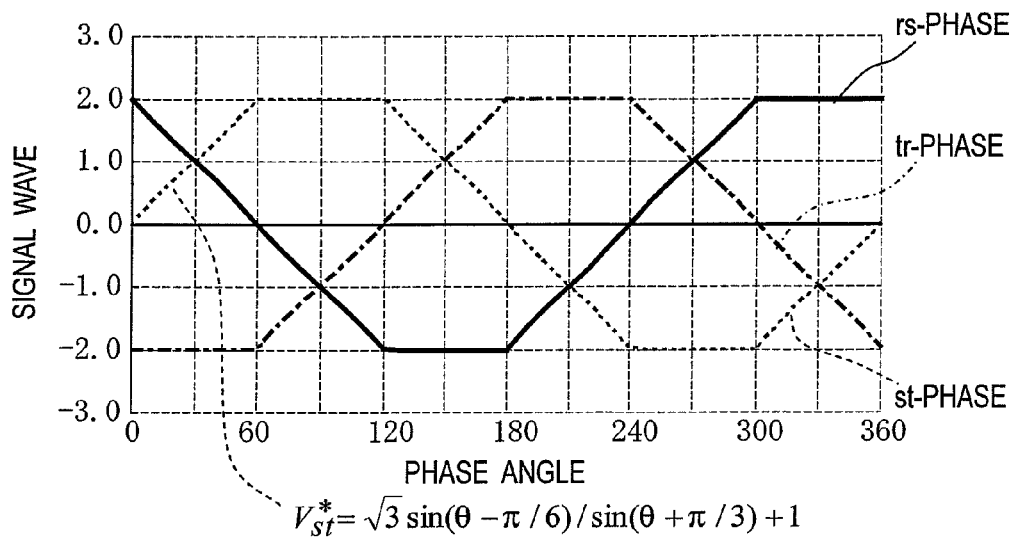
FIG. 6C is a graph showing trapezoidal modulation waveforms (line voltages) by the spatial vector modulation.

As shown in FIG. 6C, the line voltage instruction signal $V_{st}^*$ is expressed by:

$$V_{st}^* = \sqrt{3}\sin(\theta-\pi/6)/\sin(\theta+\pi/3)+1$$

Figure 7:
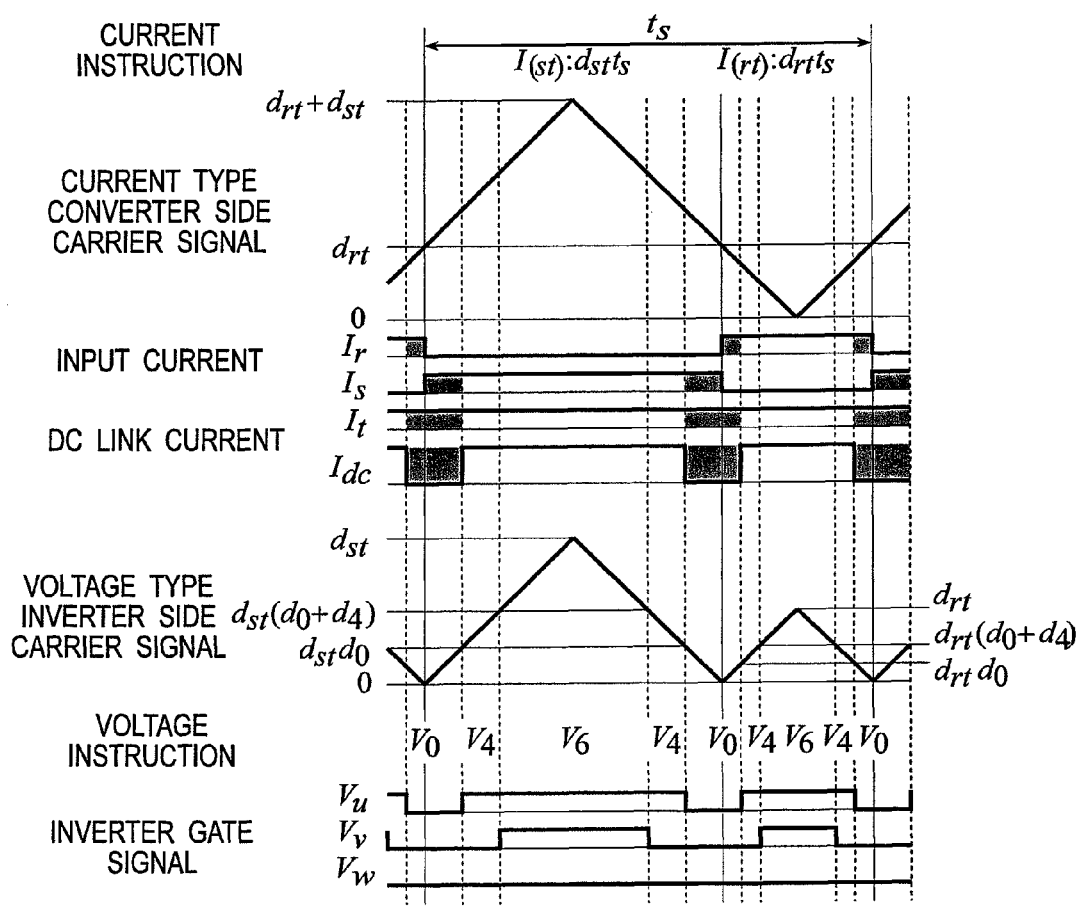
FIG. 7 is a chart showing a synchronous PWM modulation system for comparison.

FIG. 7 shows the synchronous PWM modulation system described in JP 2004-266972 A by comparison to the modulation method of Technical Document 1. In FIG. 7 are shown a carrier period $t_s$, a current instruction I(rt), a current instruction I(st), a flow ratio $d_{rt}$, a flow ratio $d_{st}$ input currents $I_r$, $I_s$, $I_t$, a dc link current $I_{dc}$, voltage instructions $V_0$, $V_4$, $V_6$, a flow ratio $d_0$ corresponding to the voltage instruction $V_0$, and a flow ratio $d_4$ corresponding to the voltage instruction $V_4$. Moreover, $V_u$, $V_v$, $V_w$ are the gate signals of the inverter.

In FIG. 7, the carrier period on the converter side is divided into two switching states in which electrification of st, rt is effected. Further, since the flow ratios are varied, two carrier signals whose carrier amplitudes are varied every electrification period are used on the inverter side. Moreover, the signal wave to be compared with the carrier signal is corrected by the carrier amplitude by being multiplied by the flow ratio of the converter. Therefore, a complicated construction as described in JP 2004-266972 A results as a modulation is circuit construction (description in the paragraphs [0021] through [0026] and FIG. 4 of JP 2004-266972 A).

Figure 8:
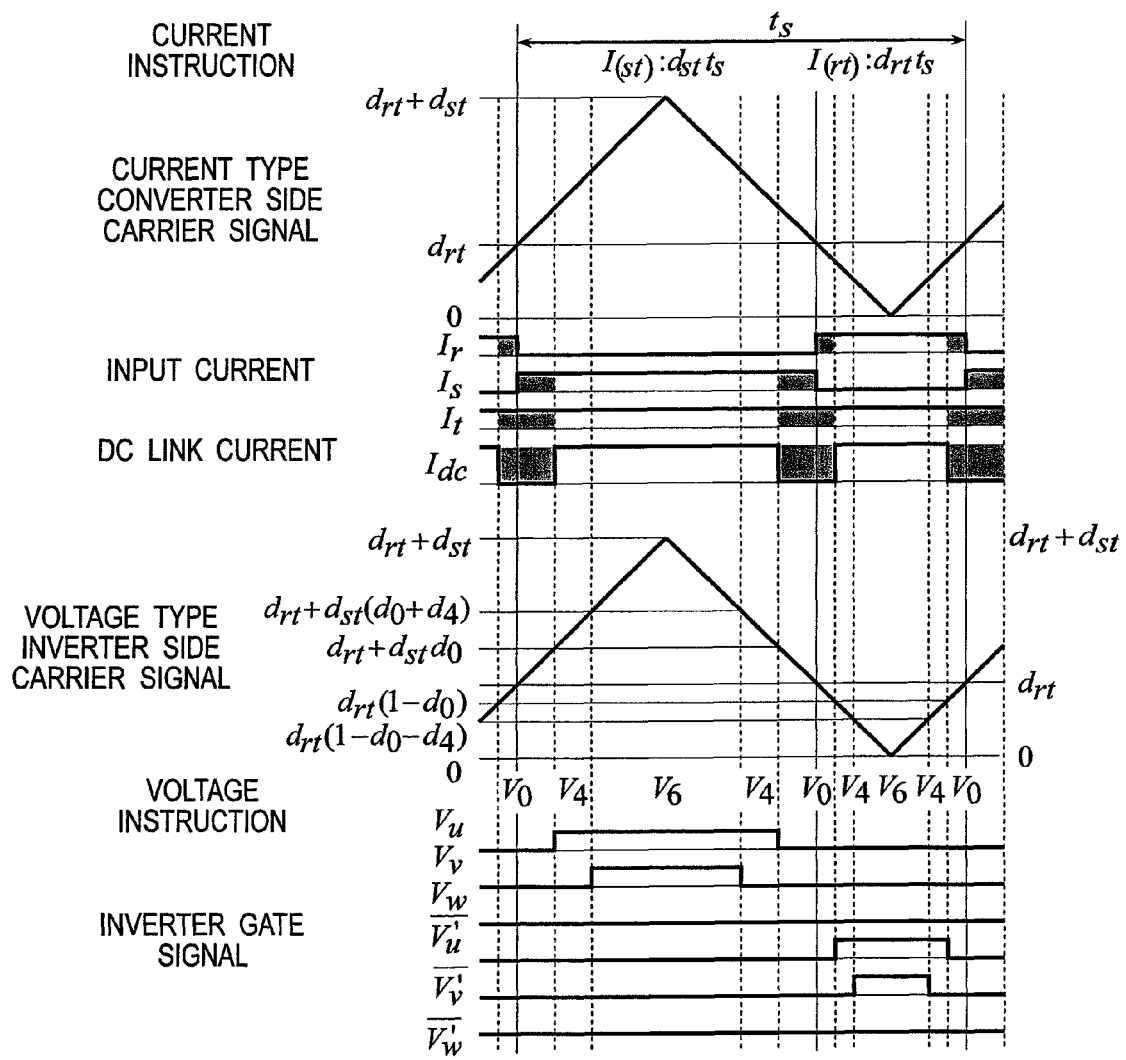
FIG. 8 is a chart showing a PWM modulation system using carrier signals of triangular waveforms of the direct power converter apparatus of the invention.

In contrast to this, FIG. 8 is a chart showing a PWM modulation system that uses a triangular waveform carrier signal of the power converter apparatus of the invention. In FIG. 8 are shown a carrier period $t_s$, a current instruction I(rt), a current instruction I(st), a flow ratio $d_{rt}$, a flow ratio $d_{st}$, input currents $I_r$, $I_s$, $I_t$, a dc link current $I_{dc}$, voltage instructions $V_0$, $V_4$, $V_6$, a flow ratio $d_0$ corresponding to the voltage instruction $V_0$, and a flow ratio $d_4$ corresponding to the voltage instruction $V_4$. Moreover, $V_u$, $V_v$, $V_w$ are the gate signals of the upper arm, and /$V_u'$, /$V_v'$, /$V_w'$ are the gate signals of the lower arm.

In FIG. 8, an identical carrier signal is used on the converter side and the inverter side. Among the two instruction signals corrected in amplitude as in the conventional case, one instruction signal is made to have an offset for comparison with the carrier signal, and the other instruction signal is inverted in polarity and compared with the carrier signal. A gate signal obtained by the operation is inverted. Moreover, an inphase gate signal can be obtained by taking the logical sum of the gate signals in each period.

Figure 9:
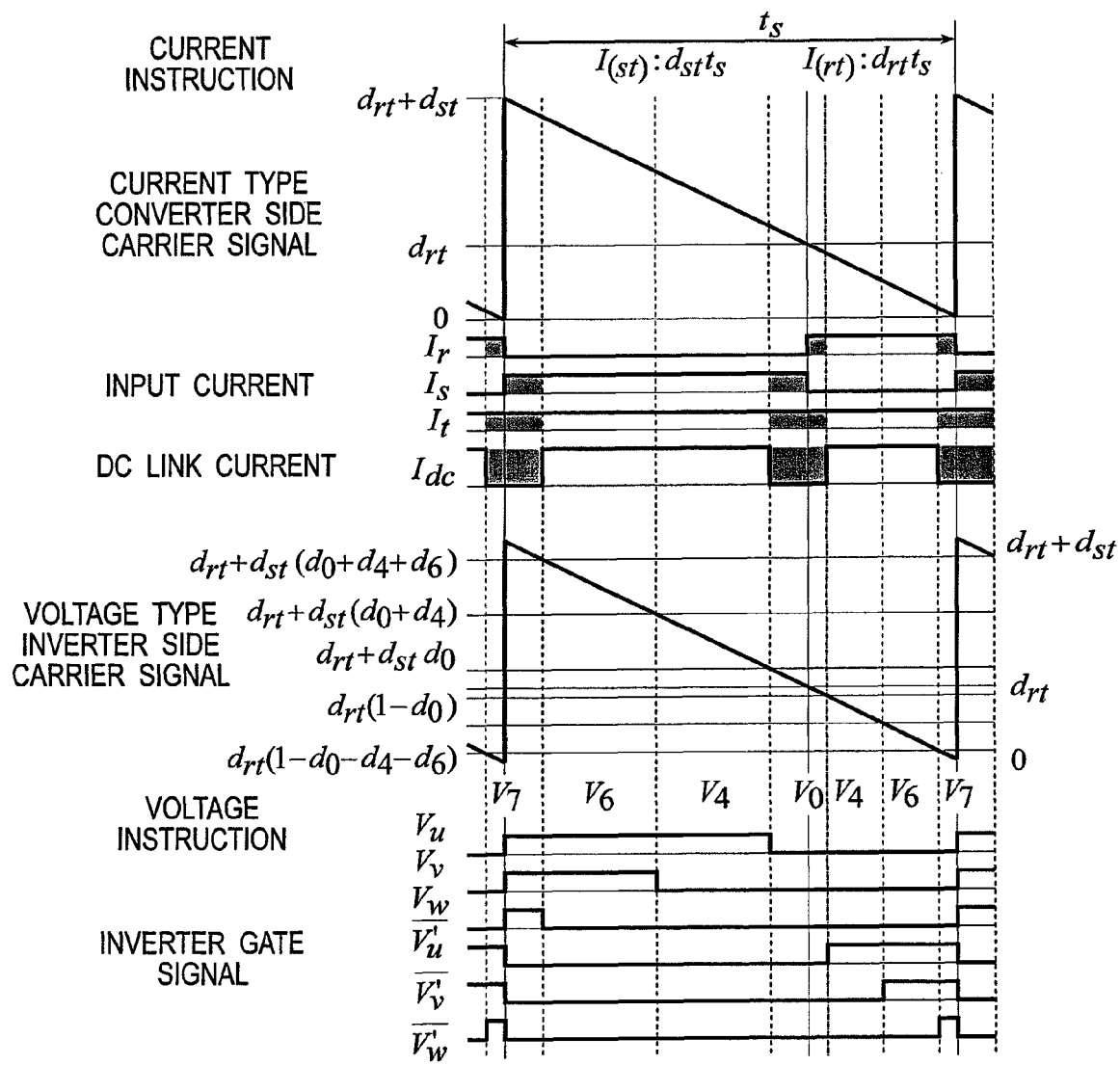
FIG. 9 is a chart showing a PWM modulation system using carrier signals of sawtooth waveforms of the direct power converter apparatus of the invention.

FIG. 9 is a chart showing a PWM modulation system that uses a sawtooth waveform carrier signal of the power converter apparatus of the invention. In FIG. 9 are shown a carrier period $t_s$, a current instruction I(rt), a current instruction I(st), a flow ratio $d_{rt}$, a flow ratio $d_{st}$, input currents $I_r$, $I_s$, $I_t$, a dc link current $I_{dc}$, voltage instructions $V_0$, $V_4$, $V_6$, a flow ratio $d_0$ corresponding to the voltage instruction $V_0$, a flow ratio $d_4$ corresponding to the voltage instruction $V_4$, and a flow ratio $d_6$ corresponding to the voltage instruction $V_6$. Moreover, $V_u$, $V_v$, $V_w$ are the gate signals of the upper arm, and $/V_u'$, $/V_v'$, $/V_w'$ are the gate signals of the lower arm.

The power converter apparatus shown in FIG. 9, in which the carrier generation and modulation processing can be simplified, is suitable for software-oriented structure. However, the direct conversion circuit with the dc link described in Technical Document 1 needs to use the null vectors of both $V_0$ and $V_7$ to commutate the converter side in the null vector period, and this is disadvantageous in terms of three-phase modulation and loss on the inverter side. Moreover, as generally known, the frequency of the sawtooth wave becomes f with respect to the frequency $2f$ of the triangular wave of the principal component of the voltage spectrum due to the carrier, and it becomes inferior in terms of noise.

As described above, according to the power converter apparatus and the power converter apparatus control method of the invention, the operational load in generating the instruction signals by the phase voltage instruction waveform on the carrier comparison basis (or the spatial vector modulation system) that causes no distortion in the line voltage (line current) with respect to the pulsating voltage (current) waveform can be reduced.

Moreover, by enabling the synchronous PWM modulation by one carrier signal (triangular wave, sawtooth wave, etc.) common to the converter section and the inverter section, the modulation circuit can be simplified.

The power converter apparatus and the power converter apparatus control method of the invention are described in detail below by the embodiments shown in the drawings.

First Embodiment

FIG. 1 is a schematic diagram of the direct power converter apparatus with a dc link of the first embodiment of the invention. The direct power converter apparatus with a dc link of the first embodiment has no smoothing filter in the dc link portion that connects the converter section with the inverter section.

As shown in FIG. 1, the direct power converter apparatus has a converter section 1 constructed of switches $S_{rp}$, $S_{rn}$, $S_{sp}$, $S_{sn}$, $S_{tp}$, $S_{tn}$, an inverter section 2 constructed of switches $S_{up}$, $S_{un}$, $S_{vp}$, $S_{vn}$, $S_{wp}$, $S_{wn}$, and a control section 3 for outputting gate signals for turning on and off the switches $S_{rp}$, $S_{rn}$, $S_{sp}$, $S_{sn}$, $S_{tp}$, $S_{tn}$ of the converter section 1 and the switches $S_{up}$, $S_{un}$, $S_{vp}$, $S_{vn}$, $S_{wp}$, $S_{wn}$ of the inverter section 2. The switches $S_{rp}$, $S_{rn}$, $S_{sp}$, $S_{sn}$, $S_{tp}$, $S_{tn}$ and the switches $S_{up}$, $S_{un}$, $S_{vp}$, $S_{vn}$, $S_{wp}$, $S_{wn}$ are the switching circuits, which are each constituted by combining a plurality of switching elements.

In the converter section 1, the phase voltage $v_r$ from a three-phase ac power source (not shown) is inputted to one terminal of the switch $S_{rp}$ and one terminal of the switch $S_{rn}$, the phase voltage $v_s$ is inputted to one terminal of the switch $S_{sp}$ and one terminal of the switch $S_{sn}$, and the phase voltage $v_t$ is inputted to one terminal of the switch $S_{tp}$ and one terminal of the switch $S_{tn}$. The other terminal of the switches $S_{rp}$, $S_{sp}$, $S_{tp}$ is connected to a first dc link portion L1, while the other terminal of the switches $S_{rn}$, $S_{sn}$, $S_{tn}$ is connected to a second dc link portion L2.

In the inverter section 2, one terminal of the switch $S_{up}$ and one terminal of the switch $S_{un}$ are connected to the output terminal of the phase voltage $v_u$ of the three-phase ac output voltage, one terminal of the switch $S_{vp}$ and one terminal of the switch $S_{vn}$ are connected to the output terminal of the phase voltage $v_v$, and one terminal of the switch $S_{wp}$ and one terminal of the switch $S_{wn}$ are connected to the output terminal of the phase voltage $v_w$. The other terminal of the switches $S_{up}$, $S_{vp}$, $S_{wp}$ is connected to the first dc link portion L1, while the other terminal of the switches $S_{un}$, $S_{vn}$, $S_{wn}$ is connected to the second dc link portion L2.

The control section 3 has a trapezoidal waveform voltage instruction signal generating part 11 as one example of the instruction signal generating part for generating trapezoidal waveform voltage instruction signals $V_r^*$, $V_s^*$, $V_t^*$ and the converter section instruction signal generating part on the basis of a power synchronization signal $V_r$ as one example of a reference signal for synchronization with the three-phase ac input voltage, a comparing part 12 for comparing the trapezoidal waveform voltage instruction signals $V_r^*$, $V_s^*$, $V_t^*$ from the trapezoidal waveform voltage instruction signal generating part 11 with the carrier signal, a current type gate logic converting part 13 that outputs a gate signal on the basis of a comparison result from the comparing part 12, an intermediate phase detecting part 14 that detects flow ratios $d_{rt}$, $d_{st}$ on the basis of the trapezoidal waveform voltage instruction signals $V_r^*$, $V_s^*$, $V_t^*$ from the trapezoidal waveform voltage instruction signal generating part 11, a carrier signal generating part 15 that generates the carrier signal, an output voltage instruction signal generating part 21 as one example of the inverter section instruction signal generating part that generates output voltage instruction signals $V_u^*$, $V_v^*$, $V_w^*$ for the inverter section 2, a calculation part 22 that outputs:

$$d_{rt} + d_{st}V^* \quad (V^*\text{:voltage vector of each phase})$$

on the basis of the output voltage instruction signals $V_u^*$, $V_v^*$, $V_w^*$ from the output voltage instruction signal generating part 21 and the flow ratios $d_{rt}$, $d_{st}$ from the intermediate phase detecting part 14, an calculation part 23 that outputs:

$$d_{rt}(1-V^*) \quad (V^*\text{:voltage vector of each phase})$$

on the basis of the output voltage instruction signals $V_u^*$, $V_v^*$, $V_w^*$ from the output voltage instruction signal generating part 21 and the flow ratio $d_{rt}$ from the intermediate phase detecting part 14, a comparing part 24 for comparing the calculation results from the calculation parts 22, 23 with the carrier signal, and a logical sum calculation part 25 that outputs a gate signal on the basis of the comparison result from the comparing part 24.

The switches $S_{rp}$, $S_{rn}$, $S_{sp}$, $S_{sn}$, $S_{tp}$, $S_{tn}$ of the converter section 1 are controlled to be turned on and off by the gate signal from the current type gate logic converting part 13, and the switches $S_{up}$, $S_{un}$, $S_{vp}$, $S_{vn}$, $S_{wp}$, $S_{wn}$ of the inverter section 2 are controlled to be turned on and off by the gate signal from logical sum calculation part 25.

The intermediate phase detecting part 14 and the calculation parts 22, 23 constitute an instruction signal correcting part. Moreover, the comparing part 12 and the current type gate logic converting part 13 constitute a converter section PWM modulation signal generating part, while the comparing part 24 and the logical sum calculation part 25 constitute an inverter section PWM modulation signal generating part.

The trapezoidal waveform voltage instruction signal generating part 11 generates sloped regions of the trapezoidal waveform voltage instruction signals $V_r^*$, $V_s^*$, $V_t^*$ by using a prescribed table. In this case, as in Equation (8) described with reference to FIGS. 5A through 5C, i.e., phase voltage instruction signals $V_u^{*}$, $V_v^{*}$, $V_w^{***}$ expressed by:

$$V_u^{*}=1,\ V_v^{*}=\sqrt{3}\tan(\theta-\pi/6),\ V_w^{***}=-1$$

values in the sloped regions of the trapezoidal waveform voltage instruction signals $V_r^*$, $V_s^*$, $V_t^*$ are preparatorily set in a table. In this case, the phase angle φ is synchronized with the phase voltage $v_r$ of the three-phase ac input voltage.

The sloped regions of the trapezoidal waveform voltage instruction signals $V_r^*$, $V_s^*$, $V_t^*$ may be obtained by using equations instead of the table.

That is, by using the prescribed equations:

$$\sqrt{3}\tan(\phi-\pi/6)$$

(provided that the phase angle φ is $0 \leq \phi \leq \pi/3$) and $$-\sqrt{3}\tan(\phi-\pi/6)$$

(provided that the phase angle φ is $\pi \leq \phi \leq 4\pi/3$) the sloped regions of the trapezoidal waveform voltage instruction signals $V_r^*$, $V_s^*$, $V_t^*$ are obtained. By this operation, a three-phase ac output voltage (current) free of distortion can reliably be obtained while reducing the operational load.

According to the direct power converter apparatus with the dc link of the above construction, the output voltage instruction signals are corrected by the instruction signal correcting parts (14, 22, 23) so that no distortion occurs in the three-phase ac output voltage (current) with respect to the pulsating voltage (current) waveform of the dc voltage converted by the converter section 1. The dc voltage converted by the converter section 1 is converted into a prescribed three-phase ac output voltage on the basis of the corrected output voltage instruction signals. In this case, the trapezoidal waveform voltage instruction signal generating part 11 can reduce the operational load of the control section with a simple construction by generating the sloped regions of the trapezoidal waveform voltage instruction signals $V_r^*$, $V_s^*$ $V_t^*$ by using the prescribed table (or the prescribed equation).

The circuit of the control section can be simplified by enabling the PWM modulation by one carrier signal common to the converter section 1 and the inverter section 2.

Second Embodiment

FIG. 2 is a schematic diagram of a matrix converter as one example of the direct power converter apparatus of the second embodiment of the invention.

As shown in FIG. 2, the matrix converter has a converting section 4 constructed of switches $S_{ur}$, $S_{us}$, $S_{ut}$, $S_{vr}$, $S_{vs}$, $S_{vt}$, $S_{wr}$, $S_{ws}$, $S_{wt}$, and a control section 5 that outputs gate signals for turning on and off the switches $S_{ur}$, $S_{us}$, $S_{ut}$, $S_{vr}$, $S_{vs}$, $S_{vt}$, $S_{wr}$, $S_{ws}$, $S_{wt}$ of the converting section 4. The converting section 4 corresponds to a virtual converter section and a virtual inverter section, and no smoothing filter is provided at a virtual dc link portion that connects the virtual converter section with the virtual inverter section. The switches $S_{ur}$, $S_{us}$, $S_{ut}$, $S_{vr}$, $S_{vs}$, $S_{vt}$, $S_{wr}$, $S_{ws}$, $S_{wt}$ are switching circuits constituted by combining a plurality of switching elements.

In the converting section 4, the phase voltage $v_r$ of a three-phase ac input voltage from a three-phase ac power source 6 is inputted to one terminal of each of the switches $S_{ur}$, $S_{vr}$, $S_{wr}$, the phase voltage $v_s$ of the three-phase ac input voltage is inputted to one terminal of each of the switches $S_{us}$, $S_{vs}$, $S_{ws}$, and the phase voltage $v_t$ of the three-phase ac input voltage is inputted to one terminal of each of the switches $S_{ut}$, $S_{vt}$, $S_{wt}$. The other terminal of each of the switches $S_{ur}$, $S_{us}$, $S_{ut}$ is connected to the output terminal of the phase voltage $v_u$, the other terminal of each of the switches $S_{vr}$, $S_{vs}$, $S_{vt}$ is connected to the output terminal of the phase voltage $v_v$, and the other terminal of each of the switches $S_{wr}$, $S_{ws}$, $S_{wt}$ is connected to the output terminal of the phase voltage $v_w$.

The control section 5 has a trapezoidal waveform voltage instruction signal generating part 31 as one example of the instruction signal generating part that generates trapezoidal waveform voltage instruction signals $V_r^*$, $V_s^*$, $V_t^*$ and the converter section instruction signal generating part on the basis of a power synchronization signal $V_r$ as one example of the reference signal for synchronization with the three-phase ac input voltage, a comparing part 32 for comparing the trapezoidal waveform voltage instruction signals $V_r^*$, $V_s^*$, $V_t^*$ from the trapezoidal waveform voltage instruction signal generating part 31 with a carrier signal, a current type gate logic converting part 33 that outputs a gate signal on the basis of a comparison result from the comparing part 32, an intermediate phase detecting part 34 that detects flow ratios $d_{rt}$, $d_{st}$ on the basis of the trapezoidal waveform voltage instruction signals $V_r^*$, $V_s^*$, $V_t^*$ from the trapezoidal waveform voltage instruction signal generating part 31, a carrier signal generating part 35 that generates the carrier signal, an output voltage instruction signal generating part 41 as one example of the inverter section instruction signal generating part that generates output voltage instruction signals $V_u^*$, $V_v^*$, $V_w^*$ for the converting section 4, a calculation part 42 that outputs:

$$d_{rt}+d_{st}V^* \quad (V^*:\text{voltage vector of each phase})$$

on the basis of the output voltage instruction signals $V_u^*$, $V_v^*$, $V_w^*$ from the output voltage instruction signal generating part 41 and the flow ratios $d_{rt}$, $d_{st}$ from the intermediate phase detecting part 34, a calculation part 43 that outputs:

$$d_{rt}(1-V^*) \quad (V^*:\text{voltage vector of each phase})$$

on the basis of the output voltage instruction signals $V_u^*$, $V_v^*$, $V_w^*$ from the output voltage instruction signal generating part 41 and the flow ratio $d_{rt}$ from the intermediate phase detecting part 34, a comparing part 44 for comparing operation results from the calculation parts 42, 43 with the carrier signal, a logical sum calculation part 45 that outputs a gate signal on the basis of a comparison result from the comparing part 44, and a gate signal combining part 50 for combining of the gate signals on the basis of a signal from the current type gate logic converting part 33 and a signal from the logical sum calculation part 45.

The switches $S_{ur}$, $S_{us}$, $S_{ut}$, $S_{vr}$, $S_{vs}$, $S_{vt}$, $S_{wr}$, $S_{ws}$, $S_{wt}$ of the converting section 4 are controlled to be turned on and off by the gate signals from the gate signal combining part 50.

The intermediate phase detecting part 34 and the calculation parts 42, 43 constitute an instruction signal correcting part. Moreover, the comparing part 32 and the current type gate logic converting part 33 constitute a converter section PWM modulation signal generating part, while the comparing part 44 and the logical sum calculation part 45 constitute an inverter section PWM modulation signal generating part.

The trapezoidal waveform voltage instruction signal generating part 31 generates sloped regions of the trapezoidal waveform voltage instruction signals $V_r^*$, $V_s^*$, $V_t^*$ by using a prescribed table. In this case, as in Equation (8) described with reference to FIGS. 5A through 5C, i.e., phase voltage instruction signals $V_u^{*}$, $V_v^{*}$, $V_w^{***}$ expressed by:

$$V_u^{*}=-1,\ V_v^{*}=\sqrt{3}\tan(\theta-\pi/6),\ V_w^{***}=-1$$

values in the sloped regions of the trapezoidal waveform voltage instruction signals $V_r^*$, $V_s^*$, $V_t^*$ are preparatorily set in a table. In this case, the phase angle φ is synchronized with the phase voltage $v_r$ of the three-phase ac input voltage.

The sloped regions of the trapezoidal waveform voltage instruction signals $V_r^*$, $V_s^*$, $V_t^*$ may be obtained by using equations instead of the table.

That is, by using the prescribed equations:

$$\sqrt{3}\tan(\phi-\pi/6)$$

(provided that the phase angle φ is $0 \leq \phi \leq \pi/3$) and $$-\sqrt{3}\tan(\phi-\pi/6)$$

(provided that the phase angle φ is $\pi \leq \phi \leq 4\pi/3$) the sloped regions of the trapezoidal waveform voltage instruction signals $V_r^*$, $V_s^*$, $V_t^*$ are obtained. By this operation, a three-phase ac output voltage (current) free of distortion can reliably be obtained while reducing the operational load.

According to the matrix converter of the above construction, the output voltage instruction signals are corrected by the instruction signal correcting parts (34, 42, 43) so that no distortion occurs in the three-phase ac output voltage (current) with respect to the pulsating voltage (current) waveform of the virtual dc voltage converted by the virtual converter section. The virtual dc voltage converted by the virtual converter section is converted into a prescribed three-phase ac output voltage by the virtual inverter section on the basis of the corrected output voltage instruction signals. In this case, the trapezoidal waveform voltage instruction signal generating part 31 can reduce the operational load of the control section with a simple construction by generating the sloped regions of the trapezoidal waveform voltage instruction signals $V_r^*$, $V_s^*$, $V_t^*$ by using the prescribed table (or the prescribed equation).

The circuit of the control section can be simplified by enabling the PWM modulation by one carrier signal common to the virtual converter section and the virtual inverter section.

Although the direct power converter apparatuses, in which the trapezoidal waveform voltage instruction signals for obtaining the sloped regions by using the table or the equation, have been described in the first and second embodiments, the invention may be applied to a power converter apparatus in which the trapezoidal waveform voltage instruction signals are applied to the inverter side. The power converter apparatuses, in which the trapezoidal waveform voltage instruction signals are applied to the inverter side, are described by the following third and fourth embodiments.

Third Embodiment

Figure 10:
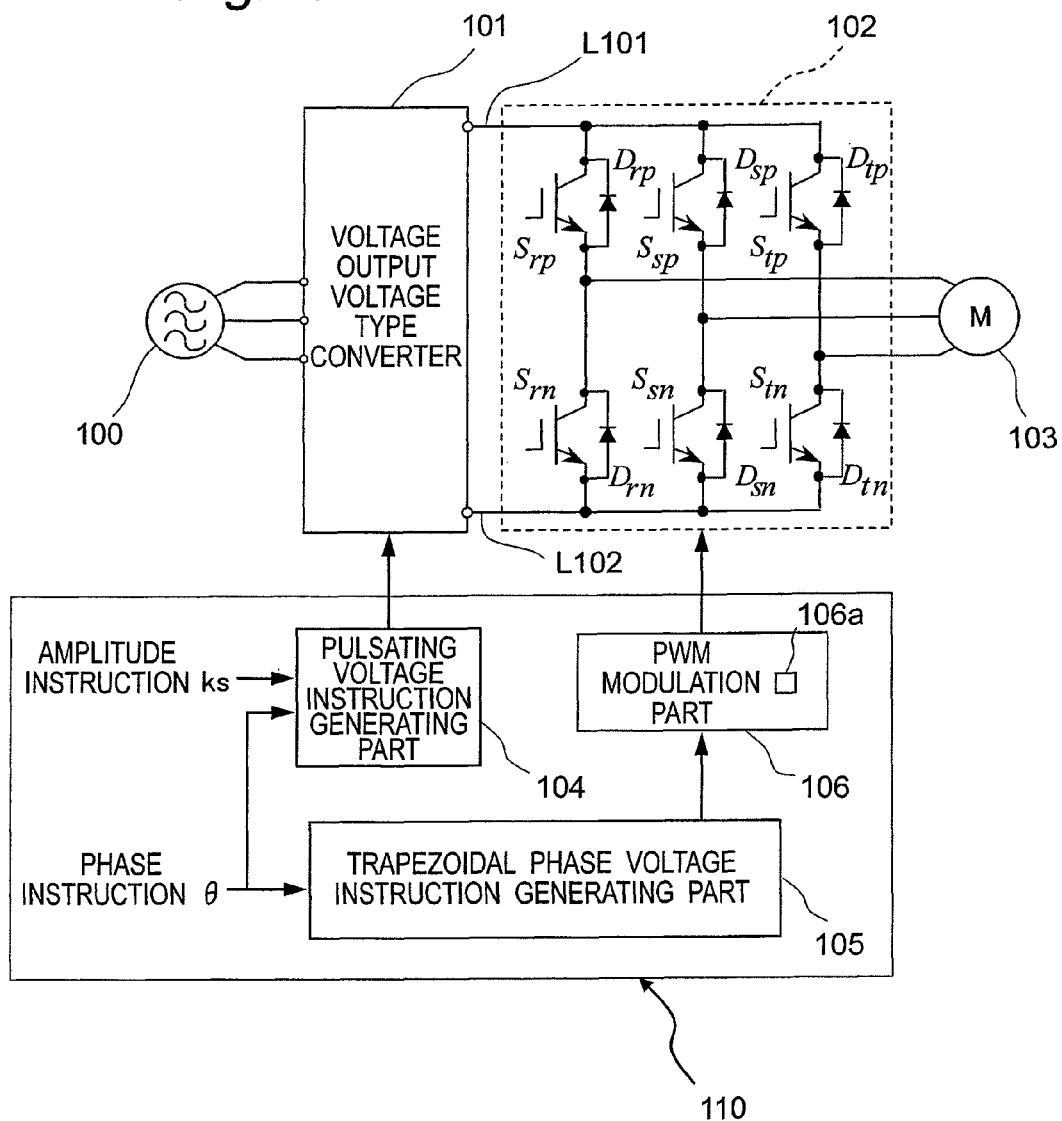
FIG. 10 is a schematic diagram of a power converter apparatus according to a third embodiment of the invention.

FIG. 10 shows a schematic diagram of the power converter apparatus of the third embodiment of the invention.

As shown in FIG. 10, the power converter apparatus of the third embodiment has a voltage output voltage type converter 101 as one example of the converter section that converts a three-phase ac voltage from a three-phase ac power source 100 into a dc voltage, an inverter section 102 that converts the dc voltage from the voltage output voltage type converter 101 and outputs the desired three-phase ac voltage to a motor 103, and a control section 110 that controls the voltage output voltage type converter 101 and the inverter section 102.

In the inverter section 102, the emitter of a transistor $S_{rp}$ and the collector of a transistor $S_{rn}$ are connected to the output terminal of the phase voltage $v_r$ of the three-phase ac output voltage, the emitter of a transistor $S_{sp}$ and the collector of a transistor $S_{sn}$ are connected to the output terminal of the phase voltage $v_s$, and the emitter of a transistor $S_{tp}$ and the collector of a transistor $S_{tn}$ are connected to the output terminal of the phase voltage $v_t$. The collectors of the transistors $S_{rp}$, $S_{sp}$, $S_{tp}$ are connected to a first dc link portion L101, while the emitters of the transistors $S_{rn}$, $S_{sn}$, $S_{tn}$ are connected to a second dc link portion L102. Moreover, diodes $D_{rp}$, $D_{sp}$, $D_{tp}$ are reversely connected between the respective collectors and emitters of the transistors $S_{rp}$, $S_{sp}$, $S_{tp}$, and diodes $D_{rn}$, $D_{sn}$, $D_{tn}$ are reversely connected between the respective collectors and emitters of the transistors $S_{rn}$, $S_{sn}$, $S_{tn}$.

Moreover, the control section 110 has a pulsating voltage instruction generating part 104 that outputs a pulsating voltage instruction signal to the voltage output voltage type converter 101 on the basis of an amplitude instruction ks and a phase instruction θ, a trapezoidal phase voltage instruction generating part 105 that generates a trapezoidal phase voltage instruction signal on the basis of the phase instruction θ, and a PWM modulation part 106 that outputs a PWM modulation signal to the inverter section 102 on the basis of the trapezoidal phase voltage instruction signal from the trapezoidal phase voltage instruction generating part 105. The PWM modulation part 106 has a carrier signal generating part 106a.

In this case, the trapezoidal phase voltage instruction generating part 105 generates the sloped regions of trapezoidal waveform voltage instruction signals by using a prescribed table or obtains the sloped regions of trapezoidal waveform voltage instruction signals by using an equation instead of the table as in the trapezoidal waveform voltage instruction signal generating part 11 shown in FIG. 1 of the first embodiment and the trapezoidal waveform voltage instruction signal generating part 31 shown in FIG. 2 of the second embodiment. By this operation, the three-phase ac output voltage (current) free of distortions can reliably be obtained while reducing the operational load.

Figure 12A:
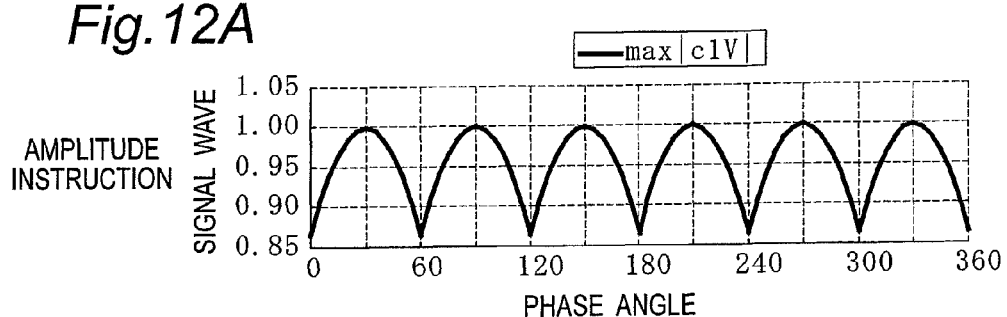
FIGS. 12A through 12C are graphs showing the instruction waveforms of the power converter apparatus.
Figure 12B:
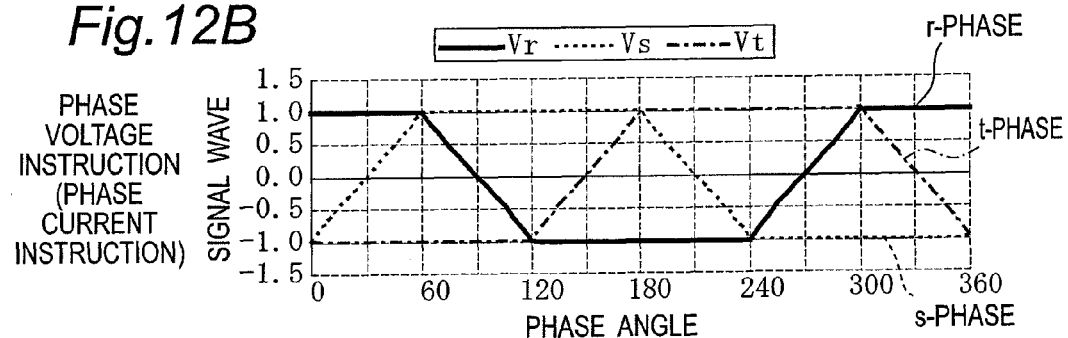
Figure 12C:
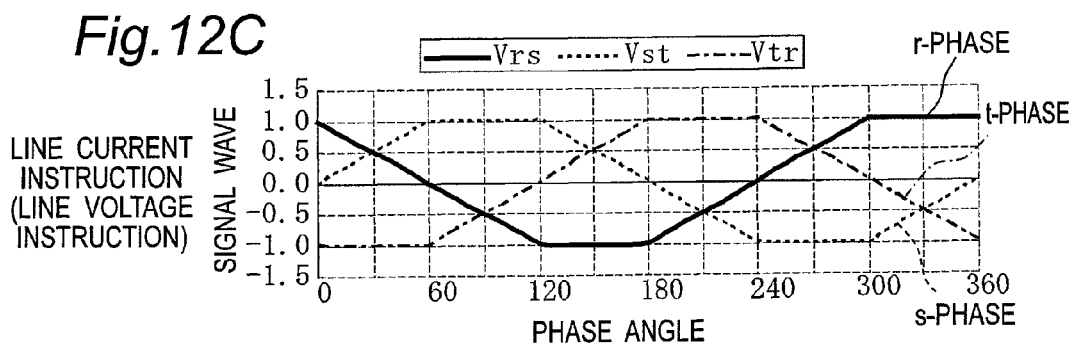

FIG. 12 shows the instruction waveforms of the above power converter apparatus, where FIG. 12A shows the waveform of the amplitude instruction, and FIG. 12B shows the phase voltage instruction waveforms. FIG. 12C shows the waveforms of the line current instructions when the converter of the current type is employed in place of the voltage output voltage type converter 101 shown in FIG. 10.

Fourth Embodiment

Figure 11:
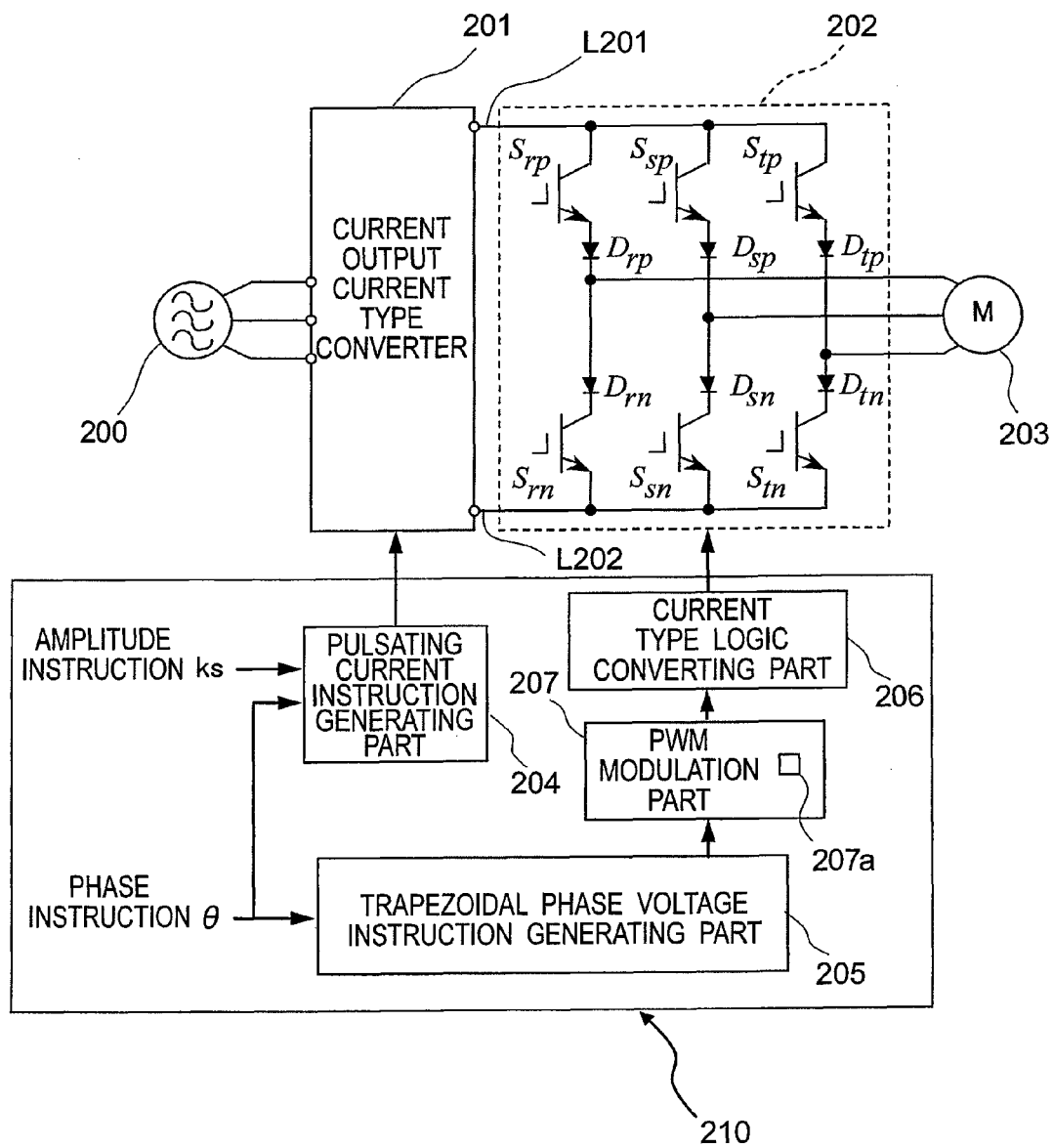
FIG. 11 is a schematic diagram of a power converter apparatus according to a fourth embodiment of the invention.

FIG. 11 shows a schematic diagram of the power converter apparatus of the fourth embodiment of the invention.

As shown in FIG. 11, the power converter apparatus of the fourth embodiment has a current output current type converter 201 as one example of the converter section that converts a three-phase ac voltage from a three-phase ac power source 200 into a dc voltage, an inverter section 202 that converts the dc voltage from the current output current type converter 201 and outputs the desired three-phase ac voltage to a motor 203, and a control section 210 that controls the current output current type converter 201 and the inverter section 202. One terminal of a first dc link portion L201 is connected to the positive pole terminal of the current output current type converter 201, while one terminal of a second dc link portion L202 is connected to the negative pole terminal of the current output current type converter 201.

In the inverter section 202, the collectors of transistors $S_{rp}$, $S_{sp}$, $S_{tp}$ are connected to the first dc link portion L201, and the anodes of diodes $D_{rp}$, $D_{sp}$, $D_{tp}$ are connected to the emitters of the transistors $S_{rp}$, $S_{sp}$, $S_{tp}$, respectively. The cathodes of the diodes $D_{rp}$, $D_{sp}$, $D_{tp}$ are connected to the output terminals of the phase voltages $v_r$, $v_s$, $v_t$, respectively. On the other hand, the emitters of the transistors $S_{rn}$, $S_{sn}$, $S_{tn}$ are connected to the second dc link portion L202, and the cathodes of diodes $D_{rn}$, $D_{sn}$, $D_{tn}$ are connected to the collectors of the transistor $S_{rn}$, $S_{sn}$, $S_{tn}$, respectively. The anodes of the diodes $D_{rn}$, $D_{sn}$, $D_{tn}$ are connected to the output terminals of the phase voltage $v_r$, $v_s$, $v_t$, respectively.

Moreover, the control section 210 has a pulsating current instruction generating part 204 that outputs a pulsating current instruction signal to the current output current type converter 201 on the basis of the amplitude instruction ks and the phase instruction θ, a trapezoidal phase voltage instruction generating part 205 that generates a trapezoidal phase voltage instruction signal on the basis of the phase instruction θ, a PWM modulation part 207 that outputs a PWM modulation signal on the basis of the trapezoidal phase voltage instruction signal from the trapezoidal phase voltage instruction generating part 205, and a current type logic converting part 206 that logically converts the PWM modulation signal from the PWM modulation part 207 and outputs the resulting signal to the inverter section 202. The PWM modulation part 207 has a carrier signal generating part 207a.

In this case, the trapezoidal phase voltage instruction generating part 205 generates the sloped regions of trapezoidal waveform voltage instruction signals by using a prescribed table or obtains the sloped regions of trapezoidal waveform voltage instruction signals by using an equation instead of the table as in the trapezoidal waveform voltage instruction signal generating part 11 shown in FIG. 1 of the first embodiment and the trapezoidal waveform voltage instruction signal generating part 31 shown in FIG. 2 of the second embodiment. By this operation, a three-phase ac output voltage (current) free of distortions can reliably be obtained while reducing the operational load.

FIG. 12 shows the instruction waveforms of the above power converter apparatus, where FIG. 12A shows the waveform of the amplitude instruction, and FIG. 12B shows the phase current instruction waveforms. FIG. 12C shows the line current instruction values that have been converted by the current type logic converting part 206 of FIG. 11 and given to the inverter section 202.

In the power converter apparatuses of the third and fourth embodiments, by determining the output times of voltage vectors by using the basic equations of the spatial vector modulation system expressed by:

$$\tau_4/T_0=(1-V_r^*)/2=(1-\sqrt{3}\tan(\phi-\pi/6))/2$$

$$\tau_6/T_0=1-\tau_4/T_0=(1+\sqrt{3}\tan(\phi-\pi/6))/2$$

the PWM waveform generation can also be performed.

Fifth Embodiment

Figure 17:
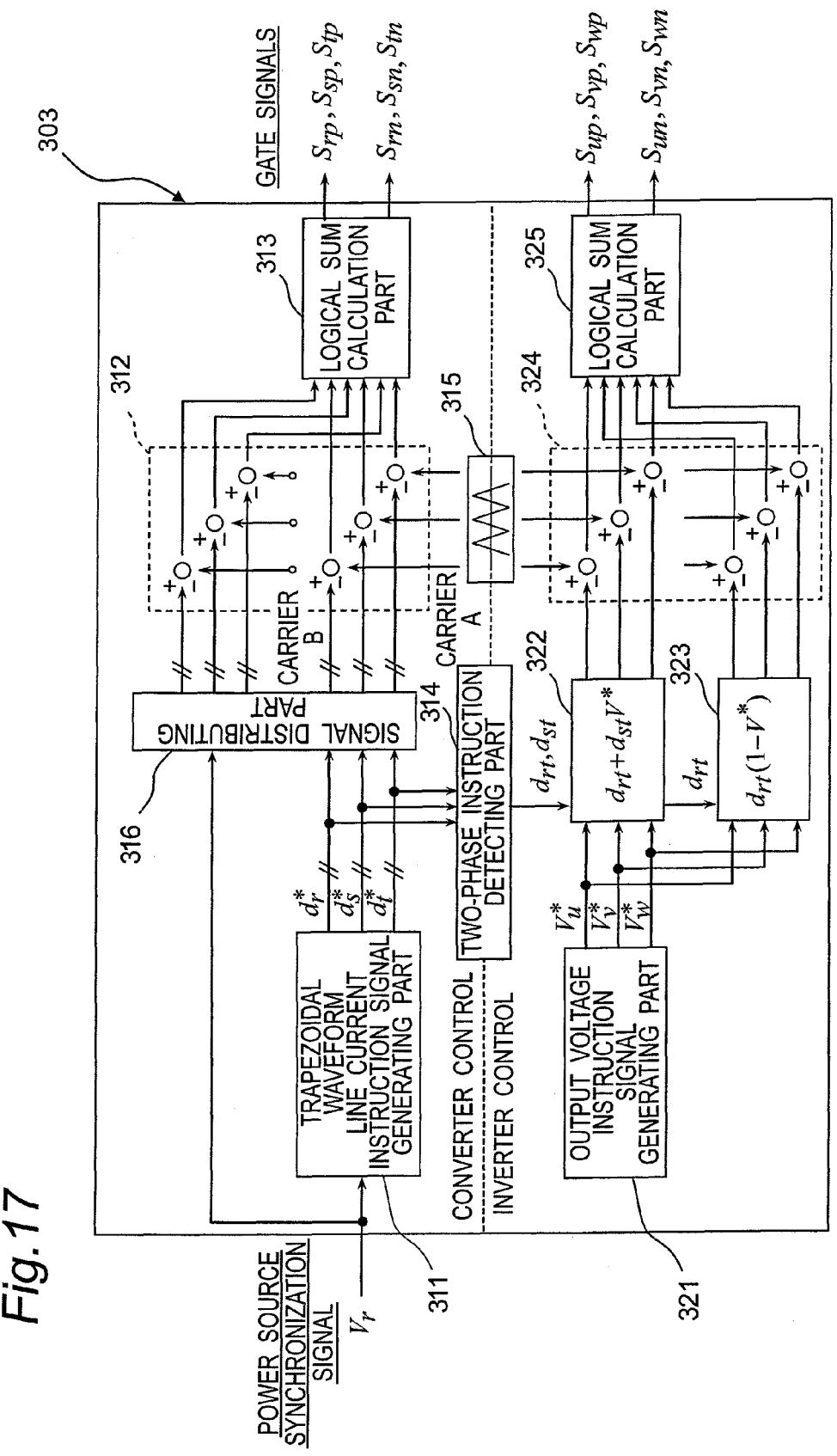
FIG. 17 is a schematic diagram of a direct power converter apparatus with a dc link according to a fifth embodiment of the invention.

FIG. 17 is a schematic diagram of the direct power converter apparatus with a dc link of the fifth embodiment of the invention. The direct power converter apparatus with the dc link of the fifth embodiment has no smoothing filter in the dc link portion that connects the converter section with the inverter section.

The direct power converter apparatus of the fifth embodiment has a construction identical to that of the converter section and the inverter section of the direct power converter apparatus shown in FIG. 1 of a first comparative example except for the control section, and the converter section and the inverter section are not shown in FIG. 17 (the converter section and the inverter section are to be referred to FIG. 1).

Moreover, the control section 303 has a trapezoidal waveform line current instruction signal generating part 311 as one example of the instruction signal generating part that generates trapezoidal waveform line current instruction signals $d_r^*$, $d_s^*$, $d_t^*$ and the converter section instruction signal generating part on the basis of a power synchronization signal $V_r$ as one example of the reference signal for synchronization with the three-phase ac input voltage, a signal distributing part 316 that outputs signal waves $d_{rpa}^*$, $d_{rpb}^*$, $d_{rna}^*$, $d_{rnb}^*$ corresponding to carrier signals A, B on the basis of the trapezoidal waveform line current instruction signals $d_r^*$, $d_s^*$, $d_t^*$ from the trapezoidal waveform line current instruction signal generating part 311 and the power synchronization signal $V_r$, a comparing part 312 for comparing the signal waves $d_{rpa}^*$, $d_{rpb}^*$, $d_{rna}^*$, $d_{rnb}^*$ from the signal distributing part 316 with the carrier signals A, B ("carrier A" and "carrier B" in FIG. 17), a logical sum calculation part 313 that outputs a gate signal on the basis of a comparison result from the comparing part 312, a two-phase instruction detecting part 314 that detects flow ratios $d_{rt}$, $d_{st}$ on the basis of the trapezoidal waveform line current instruction signals $d_r^*$, $d_s^*$, $d_t^*$ from the trapezoidal waveform line current instruction signal generating part 311, a carrier signal generating part 315 that generates the carrier signals A, B, an output voltage instruction signal generating part 321 as one example of the inverter section instruction signal generating part that generates output voltage instruction signals $V_u^*$, $V_v^*$, $V_w^*$ for the inverter section 2, a calculation part 322 that outputs:

$$d_{rt}+d_{st}V^* \quad (V^*\text{:voltage vector of each phase})$$

on the basis of the output voltage instruction signals $V_u^*$, $V_v^*$, $V_w^*$ from the output voltage instruction signal generating part 321 and the flow ratios $d_{rt}$, $d_{st}$ from the two-phase instruction detecting part 314, a calculation part 323 that outputs:

$$d_{rt}(1-V^*) \quad (V^*\text{:voltage vector of each phase})$$

on the basis of the output voltage instruction signals $V_u^*$, $V_v^*$, $V_w^*$ from the output voltage instruction signal generating part 321 and the flow ratio $d_{rt}$ from the two-phase instruction detecting part 314, a comparing part 324 for comparing operation results from the calculation parts 322, 323 with the carrier signals, and a logical sum calculation part 325 that outputs a gate signal on the basis of a comparison result from the comparing part 324.

The switches $S_{rp}$, $S_{rn}$, $S_{sp}$, $S_{sn}$, $S_{tp}$, $S_{tn}$ of the converter section 1 are controlled to be turned on and off by the gate signals from the logical sum calculation part 313, and the switches $S_{up}$, $S_{un}$, $S_{vp}$, $S_{vn}$, $S_{wp}$, $S_{wn}$ of the inverter section 2 are controlled to be turned on and off by the gate signals from the logical sum calculation part 325.

The two-phase instruction detecting part 314 and the calculation parts 322, 323 constitute an instruction signal correcting part. Moreover, the comparing part 312 and the logical sum calculation part 313 constitute a converter section PWM modulation signal generating part, while the comparing part 324 and the logical sum calculation part 325 constitute an inverter section PWM modulation signal generating part.

The trapezoidal waveform line current instruction signal generating part 311 generates the sloped regions of the trapezoidal waveform line current instruction signals $d_r^*$, $d_s^*$, $d_t^*$ by using a prescribed table.

In this case, values of the sloped regions of the trapezoidal waveform line current instruction signals $d_r^*$, $d_s^*$, $d_t^*$ are preparatorily set in a table on the basis of the following equations:

$$|d_s^*|=(1-\sqrt{3}\tan(\phi-\pi/6))/2$$

$$|d_t^*|=(1+\sqrt{3}\tan(\phi-\pi/6))/2$$

where $d_s^*$ and $d_t^*$ are line current flow ratios, and the phase angle φ is $0\leq\phi\leq\pi/3$. Moreover, the phase angle φ is synchronized with the phase voltage $v_r$ of the three-phase ac input voltage.

The sloped regions of the trapezoidal waveform line current instruction signals $d_r^*$, $d_s^*$, $d_t^*$ may be obtained by using the above equations instead of the table.

Figure 13A:
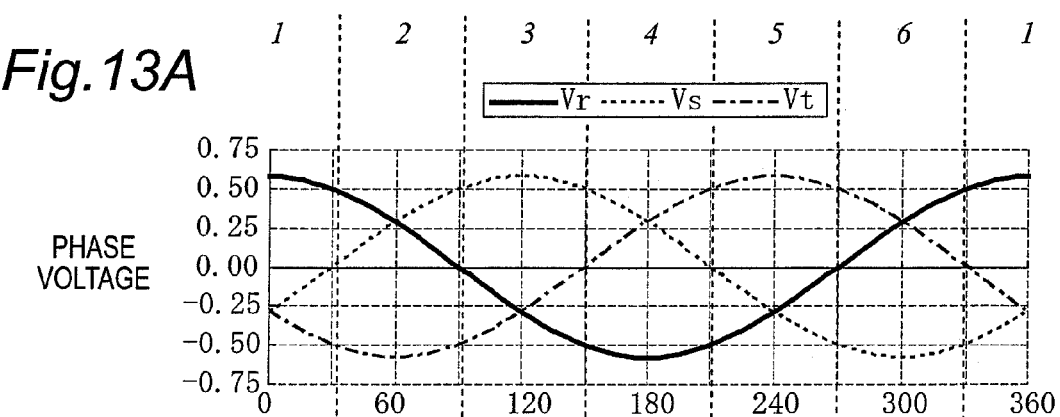
FIGS. 13A and 13B are graphs showing line current flow ratios when carrier comparison is used.
Figure 13B:
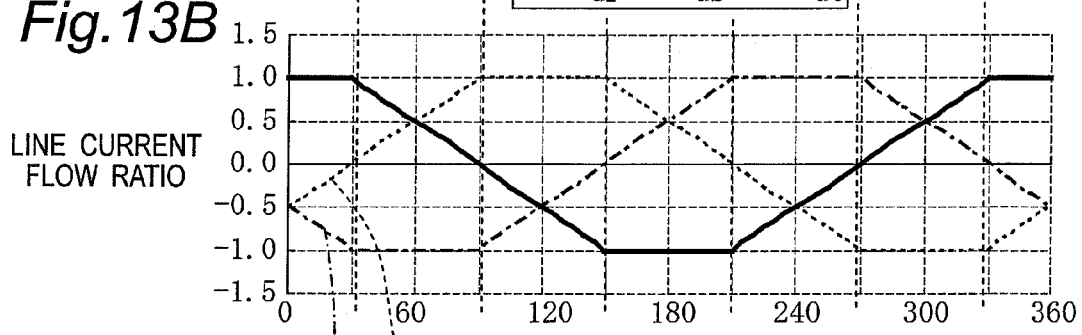

FIG. 13 shows the line current flow ratios when carrier comparison is used, where FIG. 13A shows the phase voltage waveforms, and FIG. 13B shows the line current flow ratio waveforms. For example, line current flow ratio instructions are generated by the sloped regions subjected to two-phase modulation on the basis of the above equations in the region of Mode 1 shown in FIG. 13.

The trapezoidal waveforms used in this case are equivalent to the line voltage waveforms of the trapezoidal waveform voltage instruction signals $V_r^*, V_s^*, V_t^*$ of the first comparative example (corresponding to line current instructions due to the relativities of the voltage type and the current type).

Table 1 shows the carrier signals to be subjected to comparison in every mode. Since the sum of the instruction values $(d_s^*, d_t^*)$ of the two phases becomes one, it is proper to make selection so that the two phases are subjected to comparison with different carrier signals. In this case, the carrier signal A is selected by the rising waveforms of the trapezoidal waveform line current instruction signals $d_r^*, d_s^*, d_t^*$, and the carrier signal B is selected by the falling waveforms.

TABLE 1

|  | 1 | 2 | 3 | 4 | 5 | 6 | Signal wave |
|---|---|---|---|---|---|---|---|
| $S_{rp}$ | ○ | B | X | X | X | A | $|d_r^*|$ |
| $S_{sp}$ | X | A | ○ | B | X | X | $|d_s^*|$ |
| $S_{tp}$ | X | X | X | A | ○ | B | $|d_t^*|$ |
| $S_{rn}$ | X | X | B | ○ | A | X | $|d_r^*|$ |
| $S_{sn}$ | A | X | X | X | B | ○ | $|d_s^*|$ |
| $S_{tn}$ | B | ○ | A | X | X | X | $|d_t^*|$ |

Figure 14:
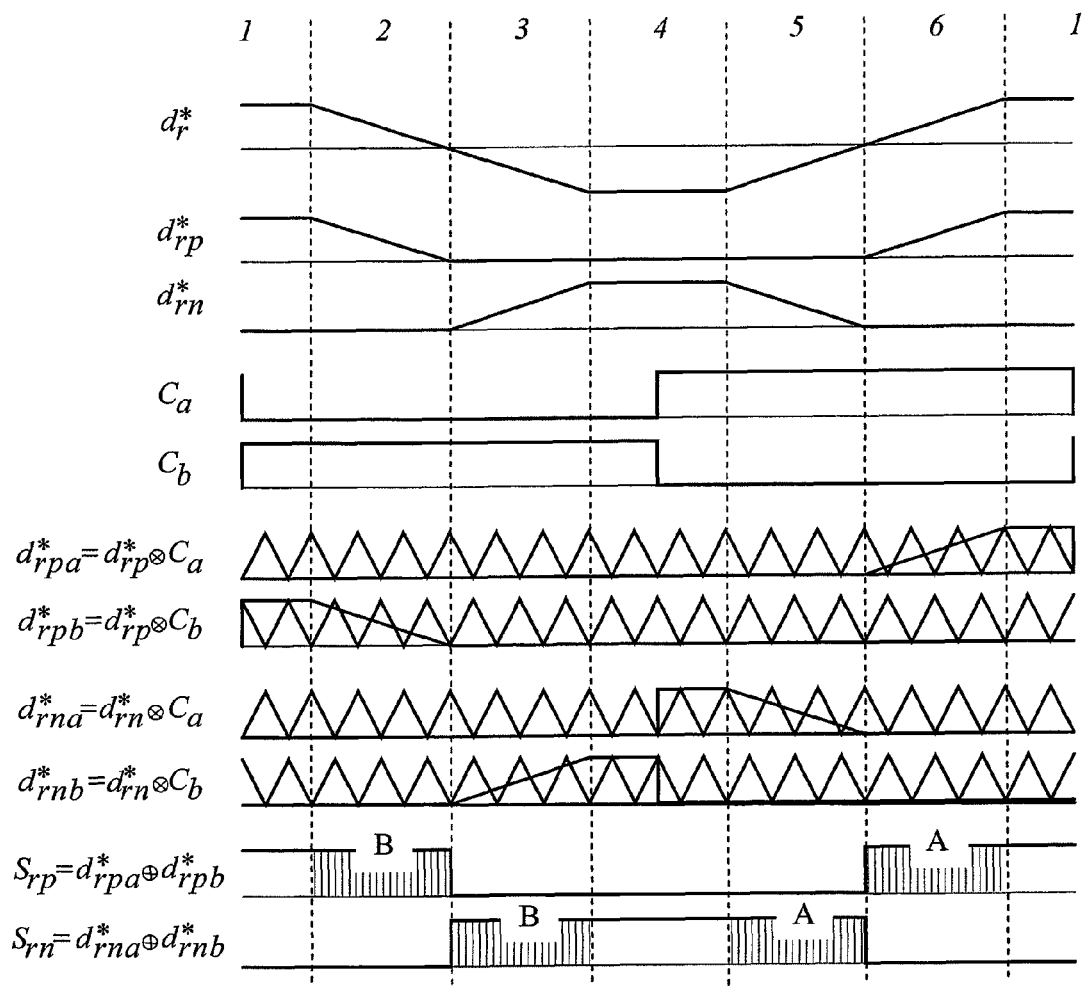
FIG. 14 is a chart for explaining the modulation system of Table 1.

FIG. 14 shows a chart for explaining the modulation system in Table 1. FIG. 14 shows the flow ratio instruction $d_r^*$, instruction $d_{rp}^*$, instruction $d_{rn}^*$, signal distribution signal $C_a$, signal distribution signal $C_b$, signal wave $d_{rpa}^*$, signal wave $d_{rpb}^*$, signal wave $d_{rna}^*$ signal wave $d_{rnb}^*$, gate signal $S_{rp}$, and gate signal $S_{rn}$ from top to bottom.

In the signal distributing part 316, the flow ratio instruction $d_r^*$ is separated into positive and negative instructions $d_{rp}^*$, $d_{rn}^*$, and thereafter, signal waves $d_{rpa}^*, d_{rpb}^*, d_{rna}^*, d_{rnb}^*$ corresponding to the carrier signals A, B to be compared are obtained on the basis of signal distribution signals $C_a$, $C_b$ obtained by advancing the phases of the waveforms of the instruction values by $\pi/2$. That is, the signal wave $d_{rpa}^*$ is obtained from the logical product of the instruction $d_{rp}^*$ and the signal distribution signal $C_a$, the signal wave $d_{rpb}^*$ is obtained from the logical product of the instruction $d_{rp}^*$ and the signal distribution signal $C_b$, the signal wave $d_{rna}^*$ is obtained from the logical product of the instruction $d_{rn}^*$ and the signal distribution signal $C_a$, and the signal wave $d_{rnb}^*$ is obtained from the logical product of the instruction $d_{rn}^*$ and the signal distribution signal $C_b$.

The signals obtained in this case are compared with the two carrier signals A, B in the comparing part 312, and thereafter, the gate signals $S_{rp}$, $S_{rn}$ of the upper and lower arms are obtained by taking a logical sum in the logical sum calculation part 313. With regard to the flow ratio instructions $d_s^*$, $d_t^*$, the gate signals $S_{sp}, S_{sn}, S_{tp}, S_{tn}$ are obtained in the same manner. That is, the gate signal $S_{rp}$ is obtained by the logical sum of the signal wave $d_{rpa}^*$ and the signal wave $d_{rpb}^*$, and the gate signal $S_{rn}$ is obtained by the logical sum of the signal wave $d_{rna}^*$ and the signal wave $d_{rnb}^*$.

According to the direct power converter apparatus of the above construction, the output voltage instruction signals are corrected by the instruction signal correcting parts (314, 322, 323) so that no distortion occurs in the three-phase ac output voltage (current) with respect to the pulsating voltage (current) waveform of the dc voltage converted by the converter section 1. The dc voltage converted by the converter section 1 is converted into the prescribed three-phase ac output voltage on the basis of the corrected output voltage instruction signals. In this case, by generating the sloped regions of the trapezoidal waveform line current instruction signals $d_r^*, d_s^*, d_t^*$ on the basis of:

$$|d_s^*| = (1-\sqrt{3}\tan(\phi-\pi/6))/2$$

$$|d_t^*| = (1+\sqrt{3}\tan(\phi-\pi/6))/2$$

by the trapezoidal waveform line current instruction signal generating part 311, the operational load of the control section can be reduced with a simple construction.

Figure 15A:
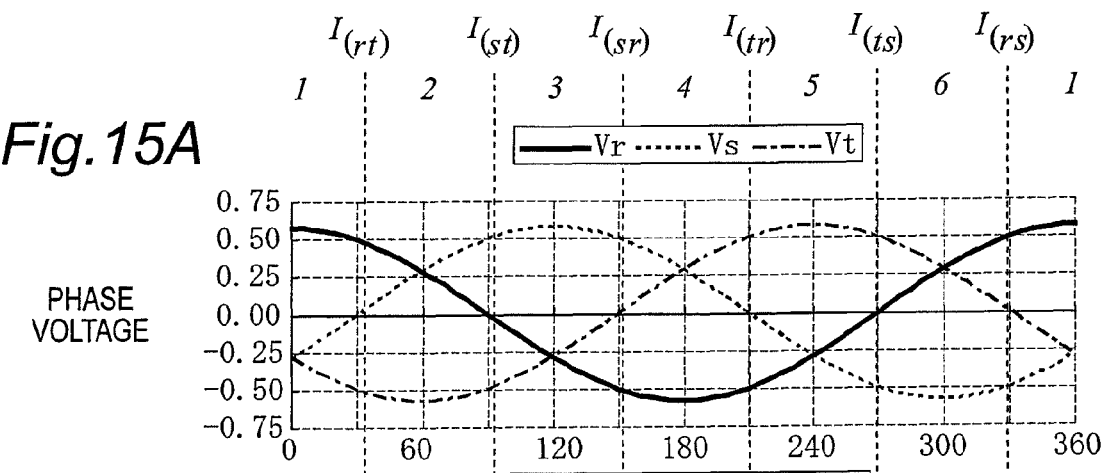
FIGS. 15A and 15B are graphs showing line current flow ratios when spatial vector modulation is used.
Figure 15B:
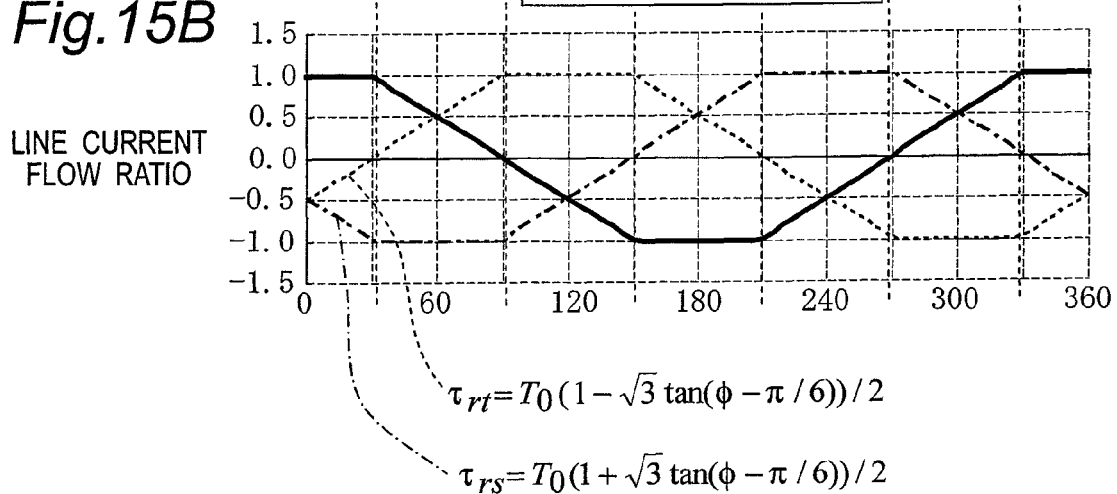
Figure 16:
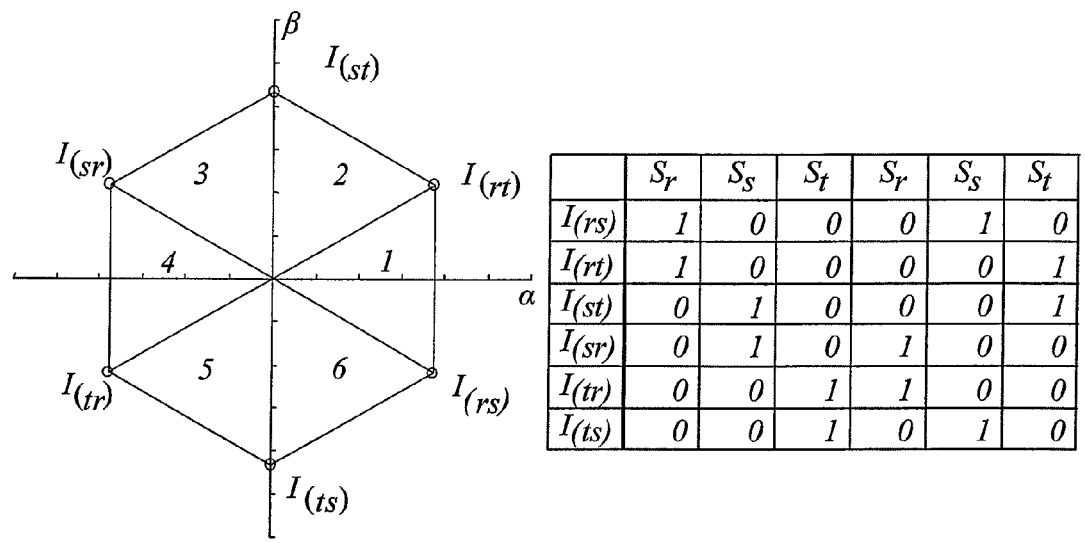
FIG. 16 is a chart for explaining the spatial vector modulation.

Likewise, it is also possible to make the same achievement by using the spatial vector modulation. FIG. 15A shows the phase voltage waveforms. FIG. 15B shows the line current flow ratio waveforms. FIG. 16 shows current vectors by the PWM modulation in the current type spatial vector modulation system.

The current vectors shown in FIG. 16 are provided by phase currents, which are trapezoidal waveform signal waves, and one phase is in the conductive state in the 60-degree period. Therefore, as shown in FIGS. 15A and 15B, the phase currents can be supplied by giving electrification time of each current vector as expressed by the following equation on the basis of the line current flow ratios of two phases.

$$\tau_{rs} = T_0(1-\sqrt{3}\tan(\phi-\pi/6))/2$$

$$\tau_{rt} = T_0(1-\sqrt{3}\tan(\phi-\pi/6))/2$$

Table 2 shows the output times of the current vectors by the PWM modulation in the current type spatial vector modulation system.

TABLE 2

|  | 1 | 2 | 3 | 4 | 5 | 6 |
|---|---|---|---|---|---|---|
| $S_{rp}$ | ○ | $\tau_{rs}$ | X | X | X | $\tau_{rt}$ |
| $S_{sp}$ | X | $\tau_{rt}$ | ○ | $\tau_{rs}$ | X | X |
| $S_{tp}$ | X | X | X | $\tau_{rt}$ | ○ | $\tau_{rs}$ |
| $S_{rn}$ | X | X | $\tau_{rt}$ | ○ | $\tau_{rs}$ | X |
| $S_{sn}$ | $\tau_{rs}$ | X | X | X | $\tau_{rt}$ | ○ |
| $S_{tn}$ | $\tau_{rt}$ | ○ | $\tau_{rs}$ | X | X | X |

Sixth Embodiment

Figure 18:
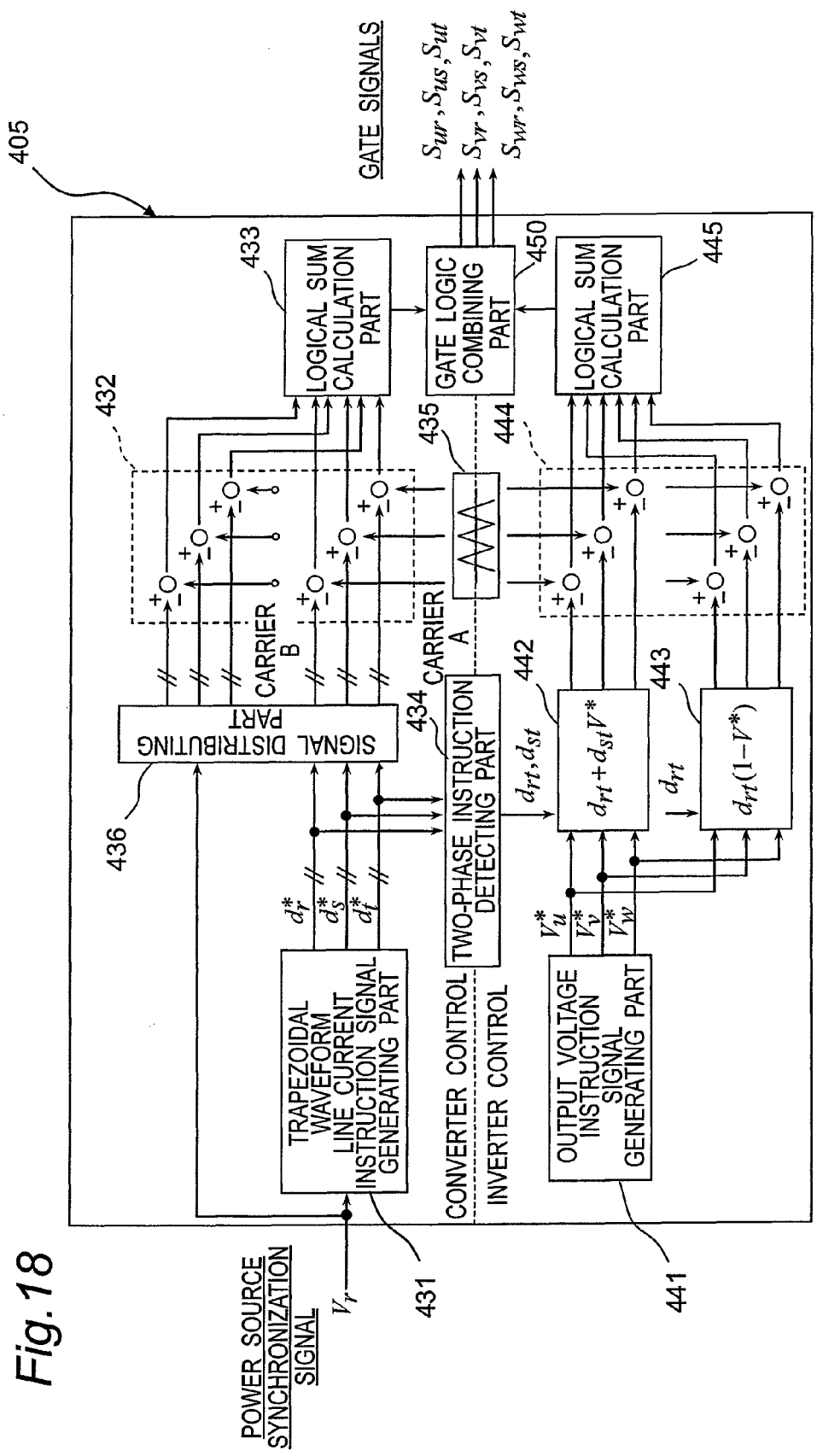
FIG. 18 is a schematic diagram of a matrix converter as one example of a direct power converter apparatus according to a sixth embodiment of the invention.

FIG. 18 is a schematic diagram of a matrix converter as one example of direct power converter apparatus of the sixth embodiment of the invention.

The direct power converter apparatus of the sixth embodiment has a construction identical to that of the converting section of the direct power converter apparatus shown in FIG. 2 of a second comparative example except for the control section, and the converting section is not shown in FIG. 18 (the converting section should be referred to FIG. 2).

A point of difference resides in that the two-phase modulation waveform is used for synchronization in the virtual converter section and the virtual inverter section in contrast to the one-phase modulation waveform. Moreover, although carrier signals of two phases are used on the virtual converter section side, a point of difference resides in that the generation of the gate signal needs no logic converting part for conversion from the phase current to the line current.

The control section 405 has a trapezoidal waveform line current instruction signal generating part 431 as one example of the instruction signal generating part that generates trapezoidal waveform line current instruction signals $d_r^*, d_s^*, d_t^*$ and the converter section instruction signal generating part on the basis of a power synchronization signal $V_r$ as one example of the reference signal for synchronization with the three-phase ac input voltage, a signal distributing part 436 that outputs signal waves $d_{rpa}*$, $d_{rpb}*$, $d_{rma}*$, $d_{rmb}*$ corresponding to carrier signals A, B on the basis of the trapezoidal waveform line current instruction signals $d_r*$, $d_s*$, $d_t*$ from the trapezoidal waveform line current instruction signal generating part 431 and the power synchronization signal $V_r$, a comparing part 432 for comparing the signal waves $d_{rpa}*$, $d_{rpb}*$, $d_{rma}*$, $d_{rmb}*$ from the signal distributing part 436 with the carrier signals A, B ("carrier A" and "carrier B" in FIG. 18), a logical sum calculation part 433 that outputs a gate signal on the basis of a comparison result from the comparing part 432, a two-phase instruction detecting part 434 that detects flow ratios $d_{rt}$, $d_{st}$ on the basis of the trapezoidal waveform line current instruction signals $d_r*$, $d_s*$, $d_t*$ from the trapezoidal waveform line current instruction signal generating part 431, a carrier signal generating part 435 that generates the carrier signals A, B, an output voltage instruction signal generating part 441 as one example of the inverter section instruction signal generating part that generates output voltage instruction signals $V_u*$, $V_v*$, $V_w*$ for the converting section 4, a calculation part 442 that outputs:

$$d_{rt}+d_{st}V* \quad (V*:\text{voltage vector of each phase})$$

on the basis of the output voltage instruction signals $V_u*$, $V_v*$, $V_w*$ from the output voltage instruction signal generating part 441 and the flow ratios $d_{rt}$, $d_{st}$ from the two-phase instruction detecting part 434, a calculation part 443 that outputs:

$$d_{rt}(1-V*) \quad (V*:\text{voltage vector of each phase})$$

on the basis of the output voltage instruction signals $V_u*$, $V_v*$, $V_w*$ from the output voltage instruction signal generating part 441 and the flow ratio $d_{rt}$ from the two-phase instruction detecting part 434, a comparing part 444 for comparing operation results from the calculation parts 442, 443 with the carrier signals, a logical sum calculation part 445 that outputs a gate signal on the basis of a comparison result from the comparing part 444, and a gate signal combining part 450 that combines the gate signals on the basis of a signal from the logical sum calculation part 433 and a signal from the logical sum calculation part 445.

The switches $S_{ur}$, $S_{us}$, $S_{ut}$, $S_{vr}$, $S_{vs}$, $S_{vt}$, $S_{wr}$, $S_{ws}$, $S_{wt}$ of the converting section 4 are controlled to be turned on and off by the gate signals from the gate signal combining part 450.

The two-phase instruction detecting part 434 and the calculation parts 442, 443 constitute an instruction signal correcting part. Moreover, the comparing part 432 and the logical sum calculation part 433 constitute a converter section PWM modulation signal generating part, while the comparing part 444 and the logical sum calculation part 445 constitute an inverter section PWM modulation signal generating part.

The trapezoidal waveform line current instruction signal generating part 431 generates the sloped regions of the trapezoidal waveform line current instruction signals $d_r*$, $d_s*$, $d_t*$ by using a prescribed table.

In this case, values in the sloped regions of the trapezoidal waveform line current instruction signals $d_r*$, $d_s*$, $d_t*$ are preparatorily set in a table as in the fifth embodiment.

The sloped regions of the trapezoidal waveform line current instruction signals $d_r*$, $d_s*$, $d_t*$ may be obtained by using the above equations instead of the table.

According to the matrix converter of the above construction, the output voltage instruction signals are corrected by the instruction signal correcting parts (434, 442, 443) so that no distortion occurs in the three-phase ac output voltage (current) with respect to the pulsating voltage (current) waveform of the virtual dc voltage converted by the virtual converter section. The virtual inverter section converts the virtual dc voltage converted by the virtual converter section into a prescribed three-phase ac output voltage on the basis of the corrected output voltage instruction signals. In this case, by generating the sloped regions of the trapezoidal waveform line current instruction signals $d_r*$, $d_s*$, $d_t*$ on the basis of:

$$|d_s*|=(1-\sqrt{3}\tan(\phi-\pi/6))/2$$

$$|d_t*|=(1+\sqrt{3}\tan(\phi-\pi/6))/2$$

by the trapezoidal waveform line current instruction signal generating part 431, the operational load of the control section can be reduced with a simple construction.

In the fifth and sixth embodiments, the direct power converter apparatuses, in which the trapezoidal waveform voltage instruction signals and the trapezoidal waveform line current instruction signals for obtaining the sloped regions by using the table or the equations are applied to the converter side, have been described. However, the invention may be applied to a power converter apparatus in which the trapezoidal waveform instruction signals are applied to the inverter side.

What is claimed is

1. A power converter apparatus comprising:
    an instruction signal generating part configured to generate a trapezoidal waveform instruction signal based on a phase angle of a reference signal;
    a carrier signal generating part configured to generate a carrier signal; and
    a converting section configured to convert a three-phase ac input voltage into a dc voltage or to convert a dc voltage into a three-phase ac output voltage based on the trapezoidal waveform instruction signal from the instruction signal generating part and the carrier signal generated by the carrier signal generating part,
    the instruction signal generating part being further configured to generate a sloped region of the trapezoidal waveform instruction signal by using a prescribed table or prescribed equations.

2. A power converter apparatus, which has a converter section configured to convert a three-phase ac input voltage into a dc voltage and an inverter section configured to convert the dc voltage converted by the converter section into a prescribed three-phase ac output voltage and which has no smoothing filter in a dc link portion that connects the converter section with the inverter section, the power converter apparatus comprising:
    a converter section instruction signal generating part configured to generate a converter section instruction signal of a trapezoidal waveform synchronized with the three-phase ac input voltage;
    a carrier signal generating part configured to generate a carrier signal;
    an inverter section instruction signal generating part configured to generate an inverter section instruction signal in order to output the prescribed three-phase ac output voltage; and
    a instruction signal correcting part configured to correct the inverter section instruction signal generated by the inverter section instruction signal generating part based on the converter section instruction signal of the trapezoidal waveform from the converter section instruction signal generating part,
    the converter section being further configured to convert the three-phase ac input voltage into the dc voltage based on the converter section instruction signal of the trapezoidal waveform from the converter section instruction signal generating part and the carrier signal from the carrier signal generating part, the inverter section being further configured to convert the dc voltage converted by the converter section into the prescribed three-phase ac output voltage based on the inverter section instruction signal corrected by the instruction signal correcting part, and the converter section instruction signal generating part being further configured to generate a sloped region of the converter section instruction signal of the trapezoidal waveform using a prescribed table or prescribed equations.

3. The power converter apparatus as claimed in claim 2, wherein the prescribed equations are:

$$\sqrt{3}\tan(\phi-\pi/6)$$

(provided that the phase angle $\phi$ is $0\leqq\phi\leqq\pi/3$) and $$-\sqrt{3}\tan(\phi-\pi/6)$$

(provided that the phase angle $\phi$ is $\pi\leqq\phi\leqq 4\pi/3$).

4. The power converter apparatus as claimed in claim 2, further comprising:

a converter section PWM modulation signal generating part configured to compare the converter section instruction signal from the converter section instruction signal generating part with the carrier signal from the carrier signal generating part, and configured to generate a converter section PWM modulation signal; and an inverter section PWM modulation signal generating part configured to compare the inverter section instruction signal from the inverter section instruction signal generating part with the carrier signal identical to that used for the converter section and generates an inverter section PWM modulation signal, the converter section being further configured to convert the three-phase ac input voltage into the dc voltage based on the converter section PWM modulation signal generated by the converter section PWM modulation signal generating part, and the inverter section being further configured to convert the dc voltage converted by the converter section into the prescribed three-phase ac output voltage based on the inverter section PWM modulation signal generated by the inverter section PWM modulation signal generating part.

5. The power converter apparatus as claimed in claim 4, wherein the carrier signal is a signal of a triangular waveform.

6. The power converter apparatus as claimed in claim 4, wherein the carrier signal is a signal of a sawtooth waveform.

7. The power converter apparatus as claimed in claim 2, wherein the converter section includes three first switching circuits having one terminal to which respective phase voltages of the three-phase ac input voltage are inputted and another terminal connected to a first dc link portion; and three second switching circuits having one terminal to which respective phase voltages of the three-phase ac input voltage are inputted and another terminal connected to a second dc link portion, and the inverter section three third switching circuits having one terminal connected to respective output terminals of the prescribed three-phase ac output voltage and another terminal connected to the first dc link portion; and three fourth switching circuits having one terminal connected to respective output terminals of the prescribed three-phase ac output voltage and another terminal connected to the second dc link portion.

8. The power converter apparatus as claimed in claim 2, wherein the power converter apparatus is a matrix converter having a virtual converter section corresponding to the converter section, a virtual inverter section corresponding to the inverter section, and a virtual dc link portion corresponding to the dc link portion, the virtual converter section and the virtual inverter section including three first switching circuits having one terminal to which a first phase voltage of the three-phase ac input voltages is inputted and another terminal connected to respective output terminals of the prescribed three-phase ac output voltage;

three second switching circuits having one terminal to which a second phase voltage of the three-phase ac input voltages is inputted and the other terminal connected to respective output terminals of the prescribed three-phase ac output voltage; and three third switching circuits having one terminal to which a third phase voltage of the three-phase ac input voltages is inputted and another terminal connected to respective output terminals of the prescribed three-phase ac output voltage.

9. The power converter apparatus as claimed in claim 1, wherein the instruction signal generating part generates a sloped region of the trapezoidal waveform instruction signal based on:

$$|d_s{}^*|=(1-\sqrt{3}\tan(\phi-\pi/6))/2$$

$$|d_t{}^*|=(1+\sqrt{3}\tan(\phi-\pi/6))/2$$

(provided that $d_s{}^*$ and $d_t{}^*$ are line current flow ratios, and the phase angle $\phi$ is $0\leqq\phi\leqq\pi/3$).

10. The power converter apparatus as claimed in claim 2, wherein the converter section instruction signal generating part generates a sloped region of the trapezoidal waveform instruction signal based on:

$$|d_s{}^*|=(1-\sqrt{3}\tan(\phi-\pi/6))/2$$

$$|d_t{}^*|=(1+\sqrt{3}\tan(\phi-\pi/6))/2$$

(provided that $d_s{}^*$ and $d_t{}^*$ are line current flow ratios, and the phase angle $\phi$ is $0\leqq\phi\leqq\pi/3$).

11. The power converter apparatus as claimed in claim 10, wherein the converter section includes three first switching circuits having one terminal to which respective phase voltages of the three-phase ac input voltage are inputted and another terminal connected to a first dc link portion; and three second switching circuits having one terminal to which respective phase voltages of the three-phase ac input voltage are inputted and another terminal connected to a second dc link portion, and the inverter section includes three third switching circuits having one terminal connected to respective output terminals of the prescribed three-phase ac output voltage and another terminal connected to the first dc link portion; and
three fourth switching circuits having one terminal connected to respective output terminals of the prescribed three-phase ac output voltage and another terminal connected to the second dc link portion.

12. The power converter apparatus as claimed in claim 10, wherein
the power converter apparatus is a matrix converter having a virtual converter section corresponding to the converter section, a virtual inverter section corresponding to the inverter section, and a virtual dc link portion corresponding to the dc link portion,
the virtual converter section and the virtual inverter section including
three first switching circuits having one terminal to which a first phase voltage of the three-phase ac input voltages is inputted and another terminal connected to respective output terminals of the prescribed three-phase ac output voltage;
three second switching circuits having one terminal to which a second phase voltage of the three-phase ac input voltages is inputted and another terminal connected to respective output terminals of the prescribed three-phase ac output voltage; and
three third switching circuits having one terminal to which a third phase voltage of the three-phase ac input voltages is inputted and another terminal connected to respective output terminals of the prescribed three-phase ac output voltage.

13. A power converter apparatus control method comprising:
generating a trapezoidal waveform instruction signal by an instruction signal generating part;
generating a carrier signal by a carrier signal generating part; and
converting a three-phase ac input voltage into a dc voltage or converting a dc voltage into a three-phase ac output voltage by a converting section based on the trapezoidal waveform instruction signal from the instruction signal generating part and the carrier signal generated by the carrier signal generating part,
a sloped region of the trapezoidal waveform instruction signal is generated by using a prescribed table or prescribed equations when generating the trapezoidal waveform instruction signal by the instruction signal generating part.

14. A power converter apparatus control method for a power converter apparatus which has a converter section configured to convert a three-phase ac input voltage into a dc voltage and an inverter section configured to convert the dc voltage converted by the converter section into a prescribed three-phase ac output voltage and which has no smoothing filter in a dc link portion that connects the converter section with the inverter section, the method comprising:
generating a converter section instruction signal of a trapezoidal waveform synchronized with the three-phase ac input voltage by a converter section instruction signal generating part;
generating a carrier signal by a carrier signal generating part;
generating an inverter section instruction signal in order to output the prescribed three-phase ac output voltage by an inverter section instruction signal generating part;
correcting the inverter section instruction signal generated by the inverter section instruction signal generating part by a instruction signal correcting part based on the converter section instruction signal of the trapezoidal waveform from the converter section instruction signal generating part;
converting the three-phase ac input voltage into the dc voltage by the converter section based on the converter section instruction signal of the trapezoidal waveform from the converter section instruction signal generating part and the carrier signal from the carrier signal generating part; and
converting the dc voltage converted by the converter section into the prescribed three-phase ac output voltage by the inverter section based on the inverter section instruction signal corrected by the instruction signal correcting part,
a sloped region of the converter section instruction signal of the trapezoidal waveform is generated by using a prescribed table or prescribed equations in the step of generating the converter section instruction signal of the trapezoidal waveform by the converter section instruction signal generating part.

15. The power converter apparatus control method as claimed in claim 14, wherein
the prescribed equations are:

$$\sqrt{3}\tan(\phi-\pi/6)$$

(provided that the phase angle $\phi$ is $0 \leq \phi \leq \pi/3$) and $$-\sqrt{3}\tan(\phi-\pi/6)$$

(provided that the phase angle $\phi$ is $\pi \leq \phi \leq 4\pi/3$).

16. The power converter apparatus control method as claimed in claim 14, wherein
a sloped region of the converter section instruction signal of the trapezoidal waveform is generated based on:

$$|d_s^*|=(1-\sqrt{3}\tan(\phi-\pi/6))/2$$

$$|d_t^*|=(1+\sqrt{3}\tan(\phi-\pi/6))/2$$

(provided that $d_s^*$ and $d_t^*$ are line current flow ratios, and the phase angle $\phi$ is $0 \leq \phi \leq \pi/3$) in the step of generating the converter section instruction signal of the trapezoidal waveform by the converter section instruction signal generating part.

17. A power converter apparatus comprising:
a PWM modulation signal generating part configured to generate a PWM modulation signal by a spatial vector modulation system; and
a converting section configured to convert a three-phase ac input voltage into a dc voltage or converts a dc voltage into a three-phase ac output voltage based on the PWM modulation signal from the PWM modulation signal generating part,
when the carrier period is $T_0$ and the phase angle is $\phi$, then the PWM modulation signal generating part generates the PWM modulation signal by using voltage vectors to be outputted based on the spatial vector modulation system based on voltage vectors at output times $\tau 4$, $\tau 6$ expressed by:

$$\tau_4=T_0(1-\sqrt{3}\tan(\phi-\pi/6))/2$$

$$\tau_6=T_0(1+\sqrt{3}\tan(\phi-\pi/6))/2$$

(provided that $0 \leq \phi \leq \pi/3$).

18. A power converter apparatus, which has a converter section configured to convert a three-phase ac input voltage into a dc voltage and an inverter section configured to convert the dc voltage converted by the converter section into a prescribed three-phase ac output voltage and which has no smoothing filter in a dc link portion that connects the converter section with the inverter section, the power converter apparatus comprising:
- a converter section PWM modulation signal generating part configured to generate a converter section PWM modulation signal synchronized with the three-phase ac input voltage by a spatial vector modulation system;
- an inverter section PWM modulation signal generating part configured to generate an inverter section PWM modulation signal in order to output the prescribed three-phase ac output voltage; and
- a PWM modulation signal correcting part configured to correct the inverter section PWM modulation signal generated by the inverter section PWM modulation signal generating part based on the converter section PWM modulation signal from the converter section PWM modulation signal generating part,
- the converter section being further configured to convert the three-phase ac input voltage into the dc voltage based on the converter section PWM modulation signal from the converter section PWM modulation signal generating part,
- the inverter section being further configured to convert the dc voltage converted by the converter section into the prescribed three-phase ac output voltage based on the inverter section PWM modulation signal corrected by the PWM modulation signal correcting part, and
- when the carrier period is $T_0$ and the phase angle is $\phi$, then the converter section PWM modulation signal generating part generates the converter section PWM modulation signal by using voltage vectors to be outputted based on the spatial vector modulation system based on voltage vectors at output times $\tau 4$, $\tau 6$ expressed by:

$$\tau_4 = T_0(1 - \sqrt{3} \tan(\phi - \pi/6))/2$$

$$\tau_6 = T_0(1 + \sqrt{3} \tan(\phi - \pi/6))/2$$

(provided that $0 \leq \phi \leq \pi/3$).

19. A power converter apparatus comprising:
- a PWM modulation signal generating part configured to generate a PWM modulation signal by a spatial vector modulation system; and
- a converting section configured to convert a three-phase ac input voltage into a dc voltage or converts a dc voltage into a three-phase ac output voltage based on the PWM modulation signal from the PWM modulation signal generating part,
- when the carrier period is $T_0$ and the phase angle is $\phi$, then the PWM modulation signal generating part generates the PWM modulation signal by using current vectors to be outputted based on the spatial vector modulation system based on current vectors at output times $\tau_{rs}$, $\tau_{rt}$ expressed by:

$$\tau_{rs} = T_0(1 - \sqrt{3} \tan(\phi - \pi/6))/2$$

$$\tau_{rt} = T_0(1 + \sqrt{3} \tan(\phi - \pi/6))/2$$

(provided that $0 \leq \phi \leq \pi/3$).

20. A power converter apparatus, which has a converter section configured to convert a three-phase ac input voltage into a dc voltage and an inverter section configured to convert the dc voltage converted by the converter section into a prescribed three-phase ac output voltage and which has no smoothing filter in a dc link portion that connects the converter section with the inverter section, the power converter apparatus comprising:
- a converter section PWM modulation signal generating part configured to generate a converter section PWM modulation signal synchronized with the three-phase ac input voltage by a spatial vector modulation system;
- an inverter section PWM modulation signal generating part configured to generate an inverter section PWM modulation signal in order to output the prescribed three-phase ac output voltage; and
- a PWM modulation signal correcting part configured to correct the inverter section PWM modulation signal generated by the inverter section PWM modulation signal generating part based on the converter section PWM modulation signal from the converter section PWM modulation signal generating part,
- the converter section being further configured to convert the three-phase ac input voltage into the dc voltage based on the converter section PWM modulation signal from the converter section PWM modulation signal generating part,
- the inverter section being further configured to convert the dc voltage converted by the converter section into the prescribed three-phase ac output voltage based on the inverter section PWM modulation signal corrected by the PWM modulation signal correcting part, and
- when the carrier period is $T_0$ and the phase angle is $\phi$, then the converter section PWM modulation signal generating part generates the converter section PWM modulation signal by using current vectors to be outputted based on the spatial vector modulation system based on current vectors at output times $\tau_{rs}$, $\tau_{rt}$ expressed by:

$$\tau_{rs} = T_0(1 - \sqrt{3} \tan(\phi - \pi/6))/2$$

$$\tau_{rt} = T_0(1 + \sqrt{3} \tan(\phi - \pi/6))/2$$

(provided that $0 \leq \phi \leq \pi/3$).

21. The power converter apparatus as claimed in claim 1, wherein
the prescribed equations are:

$$\sqrt{3} \tan(\phi - \pi/6)$$

(provided that the phase angle $\phi$ is $0 \leq \phi \leq \pi/3$) and $$-\sqrt{3} \tan(\phi - \pi/6)$$

(provided that the phase angle $\phi$ is $\pi \leq \phi \leq 4\pi/3$).

22. The power converter apparatus control method as claimed in claim 13, wherein
the prescribed equations are:

$$\sqrt{3} \tan(\phi - \pi/6)$$

(provided that the phase angle $\phi$ is $0 \leq \phi \leq \pi/3$) and $$-\sqrt{3} \tan(\phi - \pi/6)$$

(provided that the phase angle $\phi$ is $\pi \leq \phi \leq 4\pi/3$).

23. The power converter apparatus control method as claimed in claim 13, wherein
a sloped region of the converter section instruction signal of the trapezoidal waveform is generated based on:

$$|d_s^*| = (1 - \sqrt{3} \tan(\phi - \pi/6))/2$$

$$|d_t^*| = (1 + \sqrt{3} \tan(\phi - \pi/6))/2$$

(provided that $d_s^*$ and $d_t^*$ are line current flow ratios, and the phase angle $\phi$ is $0 \leq \phi \leq \pi/3$) in the step of generating the converter section instruction signal of the trapezoidal waveform by the converter section instruction signal generating part.

* * * * *